US010046254B2

(12) United States Patent
Stamey, Jr. et al.

(10) Patent No.: US 10,046,254 B2
(45) Date of Patent: Aug. 14, 2018

(54) ENDCAP BYPASS PLUG, ENDCAP ASSEMBLY AND FILTER ASSEMBLY

(71) Applicant: MANN+HUMMEL Filtration Technology Group Inc., Gastonia, NC (US)

(72) Inventors: Willie L. Stamey, Jr., Kings Mountain, NC (US); Mark A. Roll, Bessemer City, NC (US)

(73) Assignee: MANN+HUMMEL Filtration Technology Group Inc., Gastonia, NC (US)

( * ) Notice: Subject to any disclaimer, the term of this patent is extended or adjusted under 35 U.S.C. 154(b) by 51 days.

(21) Appl. No.: 15/182,427

(22) Filed: Jun. 14, 2016

(65) Prior Publication Data

US 2016/0288030 A1    Oct. 6, 2016

Related U.S. Application Data

(62) Division of application No. 13/827,340, filed on Mar. 14, 2013.
(Continued)

(51) Int. Cl.
*B01D 35/147* (2006.01)
*B01D 29/13* (2006.01)
(Continued)

(52) U.S. Cl.
CPC .......... *B01D 35/147* (2013.01); *B01D 29/13* (2013.01); *B01D 35/30* (2013.01); *B01D 29/21* (2013.01);
(Continued)

(58) Field of Classification Search
CPC ...... B01D 35/147; B01D 35/30; B01D 29/13; B01D 29/21; B01D 2201/162; B01D 2201/291
(Continued)

(56) References Cited

U.S. PATENT DOCUMENTS 3,807,561 A      4/1974  Cullis
2008/0308486 A1* 12/2008 Hacker ................. B01D 29/21
                                                                        210/440

FOREIGN PATENT DOCUMENTS

DE           19809989 A1      9/1999
DE         102009033263 A1    2/2010

OTHER PUBLICATIONS

International Search Report and Written Opinion dated Nov. 28, 2013 relating to Application No. PCT/US2013/057282.
(Continued)

*Primary Examiner* — Madeline Gonzalez
(74) *Attorney, Agent, or Firm* — Honigman Miller Schwartz and Cohn LLP

(57) ABSTRACT

An endcap bypass plug includes a body and a plurality of leg members. The body includes an upper surface, a lower surface, and an outer side surface joining the upper and lower surfaces. The plurality of leg members are connected to and extend away from the upper surface of the body. Adjacent leg members of the plurality of leg members are spaced apart by a distance to form a plurality of radial passages defining a plurality of radial fluid-flow paths. Each leg member includes a head portion having an upper surface. The head portion includes a nose portion extending radially outwardly from the head portion and including a ramp surface and a lower surface. The ramp surface of the nose portion is connected to the upper surface to define an upper edge. The ramp surface is connected to the lower surface of the nose portion to define a lower edge.

17 Claims, 30 Drawing Sheets

Related U.S. Application Data

(60) Provisional application No. 61/656,344, filed on Aug. 30, 2012.

(51) Int. Cl.
    *B01D 35/30*     (2006.01)
    *B01D 29/21*     (2006.01)

(52) U.S. Cl.
    CPC .... *B01D 2201/16* (2013.01); *B01D 2201/162* (2013.01); *B01D 2201/291* (2013.01)

(58) Field of Classification Search
    USPC ......... 210/767, 497.01, 541, 450, 493.2, 97, 210/111, 130, 133, 137, 429, 430, 418
    See application file for complete search history.

(56) References Cited

OTHER PUBLICATIONS

German Office Action for Application No. 112013004256.8 dated Mar. 24, 2016 with its English translation thereof.
U.S. Patent and Trademark Office Non-Final Office Action dated Mar. 7, 2016, relating to U.S. Appl. No. 13/827,340.

\* cited by examiner

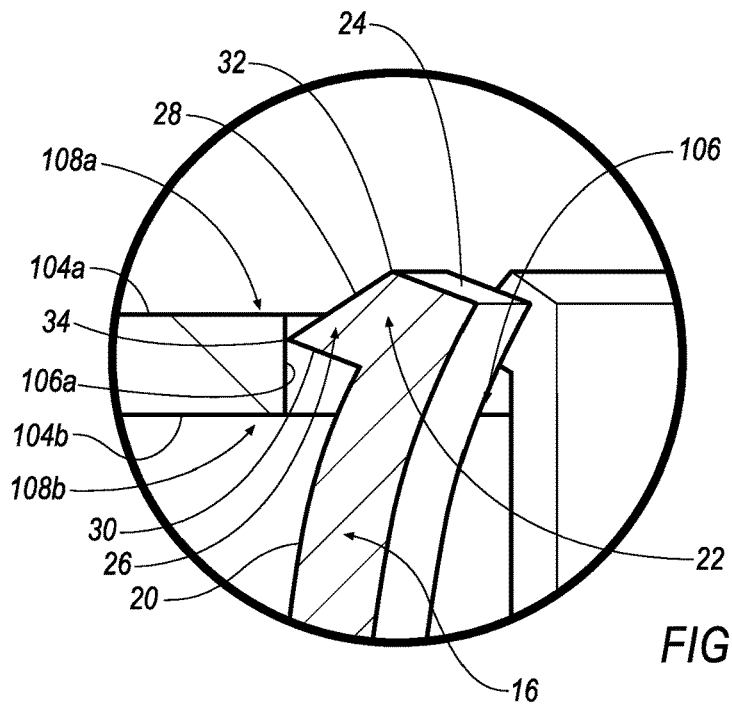
FIG. 9B'''
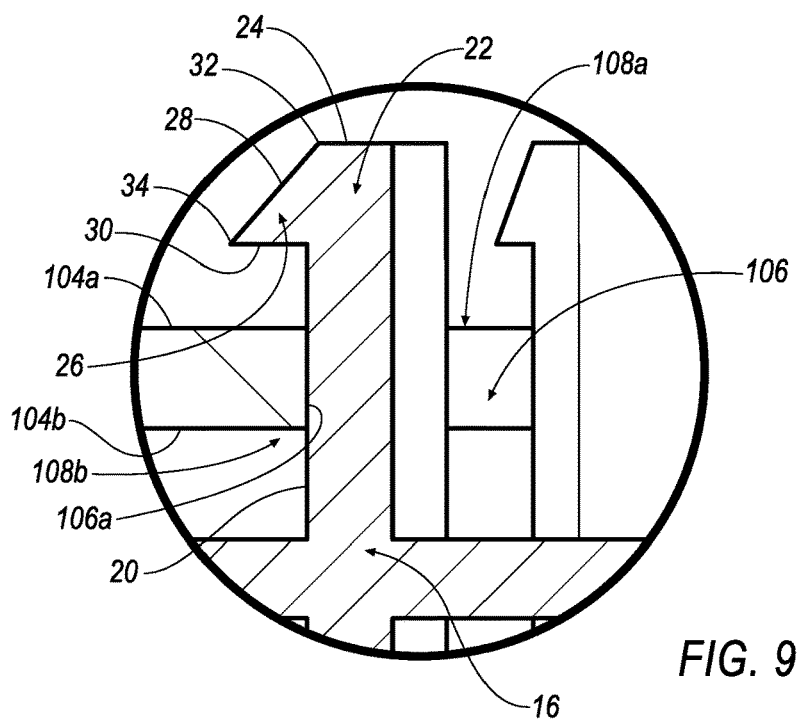
FIG. 9B''''

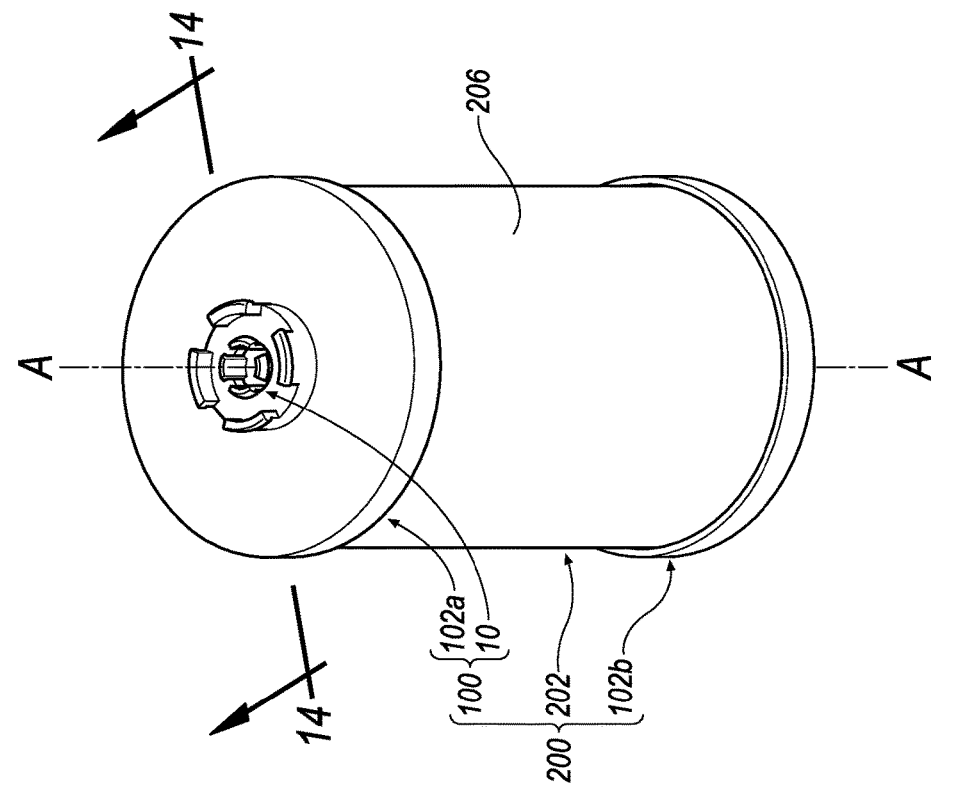
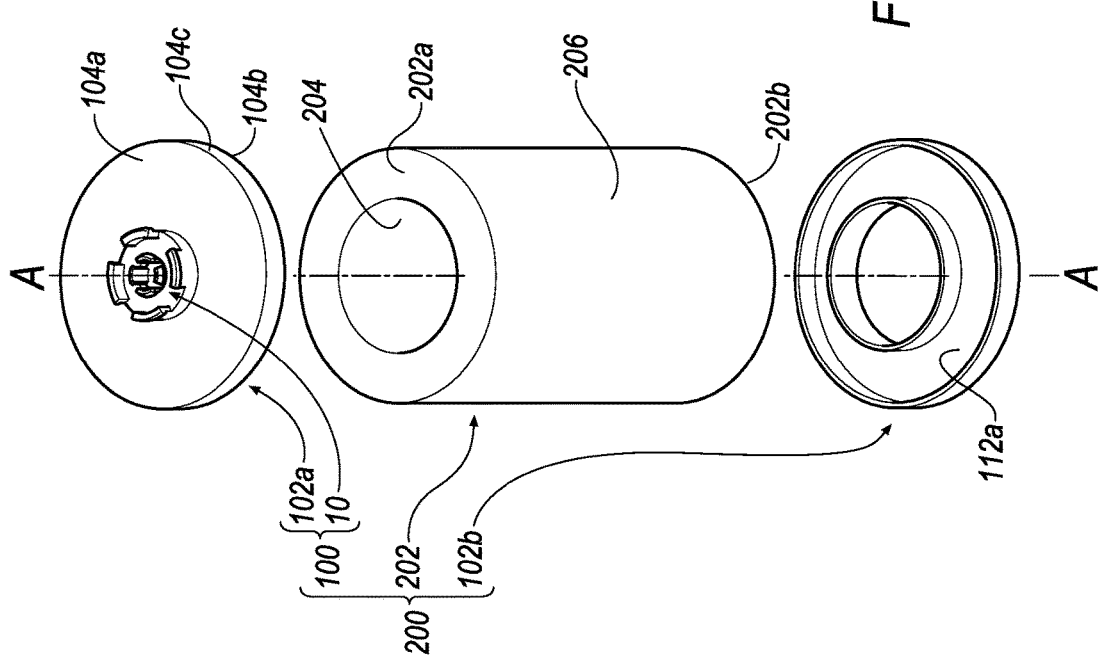
FIG. 12
FIG. 13

ENDCAP BYPASS PLUG, ENDCAP ASSEMBLY AND FILTER ASSEMBLY

CROSS-REFERENCE TO RELATED APPLICATIONS

This U.S. patent application is a divisional of, and claims priority under 35 U.S.C. § 120 from, U.S. patent application Ser. No. 13/827,340, filed on Mar. 14, 2013, which claims priority under 35 U.S.C. § 119(e) to U.S. Provisional Application 61/656,344 filed on Jun. 6, 2012. The disclosures of these prior applications are considered part of the disclosure of this application and are hereby incorporated by reference in their entirety.

TECHNICAL FIELD

The disclosure relates to an endcap bypass plug, endcap assembly and a filter assembly.

BACKGROUND

Various filters are known in the art for filtering fluid as it passes through a fluid path. Filters include, in part, filter media which removes impurities from a fluid, such as, for example, oil or fuel that passes through filter media.

In most applications, either a filter assembly or the filter media associated therewith must be periodically replaced to reduce the potential of developing unacceptably high impedance in the fluid path flow restriction.

While known filters have proven to be acceptable for various applications, such conventional filters are nevertheless susceptible to improvements that may enhance their overall performance and cost. Therefore, a need exists to develop improved filters and methodologies for forming the same that advance the art.

DESCRIPTION OF THE DRAWINGS

The disclosure will now be described, by way of example, with reference to the accompanying drawings, in which:

FIG. 4' is a side view of an alternative, exemplary endcap bypass plug.

FIG. 5' is a cross-sectional view of the endcap bypass plug of FIG. 4'.

FIGS. 9B'-9B'''' are enlarged views of the endcap assembly according to line 9B'-9B'''' of FIG. 9B.

FIG. 10' is an enlarged view of the endcap assembly in the assembled, sealed orientation according to line 10' of FIG. 7.

FIG. 11' is an enlarged view of the endcap assembly in the assembled, unsealed orientation.

FIG. 12 is an exploded, perspective view of an exemplary filter assembly including the exemplary endcap assembly of FIG. 7.

FIG. 13 is an assembled, perspective view of filter assembly of FIG. 12.

FIG. 27A' is a cross-sectional view of an exemplary endcap assembly including an exemplary endcap bypass plug arranged in an assembled, sealed orientation.

SUMMARY

Figure 1:
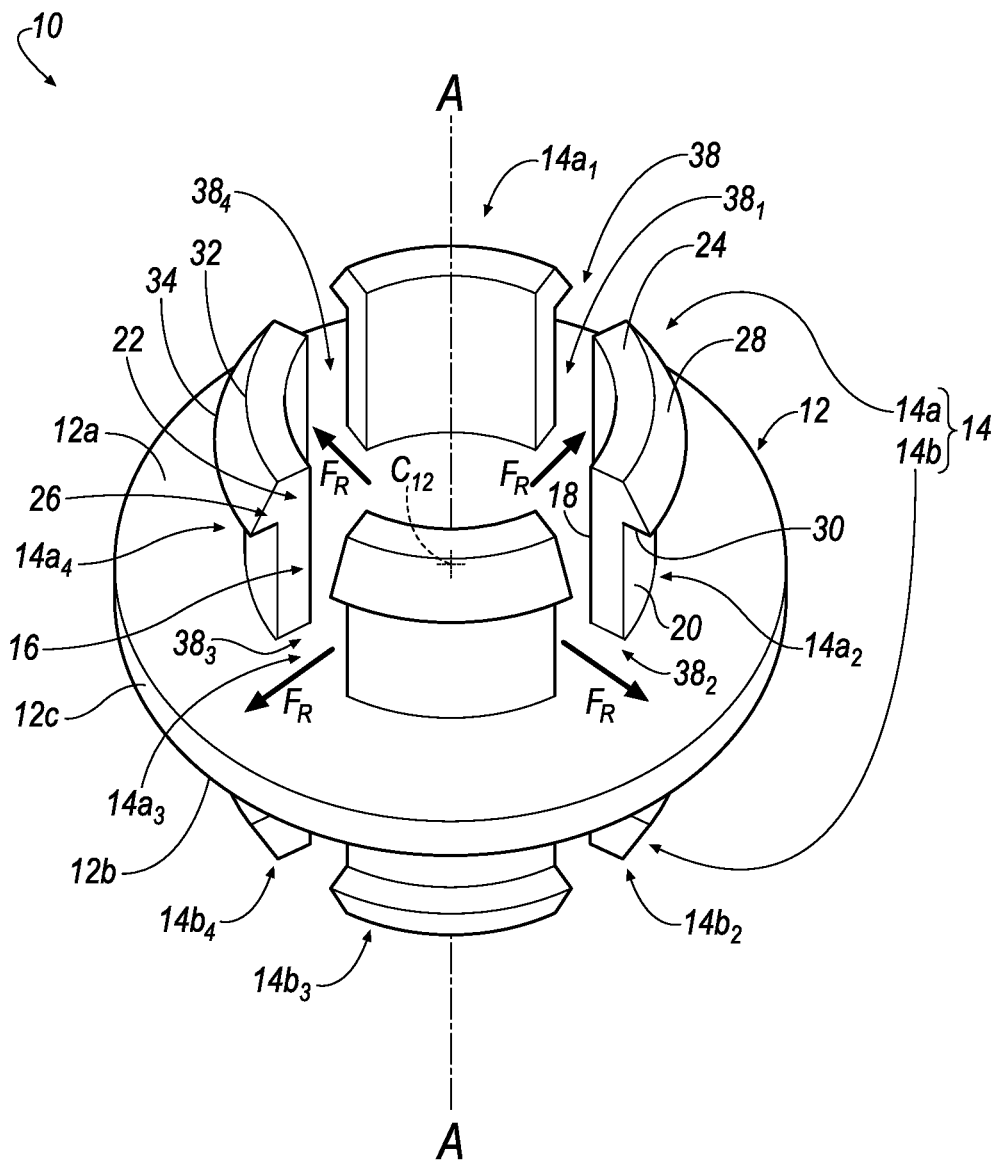
FIG. 1 is a top perspective view of an exemplary endcap bypass plug.

One aspect of the disclosure provides an endcap bypass plug. The endcap bypass plug includes a body and a plurality of leg members. The body includes an upper surface, a lower surface and an outer side surface joining the upper surface to the lower surface. A central axis extends through an axial center of the body. The plurality of leg members are connected to and extend away from the upper surface of the body. Adjacent leg members of the plurality of leg members are spaced apart by a distance to thereby form a plurality of radial passages defining a plurality of radial fluid-flow paths there between. Each leg member of the plurality of leg members includes: a head portion having an upper surface. The head portion includes a nose portion extending radially outwardly from the head portion. The nose portion includes a ramp surface and a lower surface. The ramp surface of the nose portion is connected to the upper surface of the head portion to define an upper edge. The ramp surface of the nose portion is connected to the lower surface of the nose portion to define a lower edge.

In some examples, the each leg member of the plurality of leg members includes a stem portion that extends axially away from the upper surface of the body.

In some implementations, the stem portion includes an inwardly-facing surface and an outwardly-facing surface. The inwardly-facing surface is spaced from the central axis at a first radial distance. The outwardly-facing surface is spaced from the central axis at a second radial distance that is greater than the first radial distance for defining the stem portion to include an arcuate geometry. Opposing leg members of the plurality of leg members are arranged about the central axis in a circular orientation such that: the inwardly-facing surface of the stem portion of each leg member of the plurality of leg members forms a first diameter, and, the outwardly-facing surface of the stem portion of each leg member of the plurality of leg members forms a second diameter. The second diameter is greater than the first diameter.

In some examples, the upper edge of each leg member of the plurality of leg members is spaced from the central axis at a third radial distance such that the upper edge of each leg member of the plurality of leg members forms a third diameter. The lower edge of each leg member of the plurality of leg members is spaced from the central axis at a fourth radial distance such that the lower edge of each leg member of the plurality of leg members forms a fourth diameter. The fourth diameter is greater than the third diameter to define the ramp surface of each leg member of the plurality of leg members to include an arcuate geometry.

In some implementations, the outer side surface of the body is spaced from the central axis at a fifth radial distance such that the body forms a fifth diameter. The fifth diameter is greater than the fourth diameter.

In some examples, the stem portion includes an outwardly-facing surface. The outwardly-facing surface is spaced from a central axis at a first radial distance for defining the stem portion to include a cylindrical geometry. The outwardly-facing surface of the stem portion forms a first diameter.

In some examples, the opposing leg members of the plurality of leg members are arranged about the central axis in a circular orientation. The upper edge of each leg member of the plurality of leg members is spaced from the central axis at a second radial distance such that the upper edge of each leg member of the plurality of leg members forms a second diameter. The lower edge of each leg member of the plurality of leg members is spaced from the central axis at a third radial distance such that the lower edge of each leg member of the plurality of leg members forms a third diameter. The second diameter is greater than the first diameter. The third diameter is greater than the second diameter to define the ramp surface of each leg member of the plurality of leg members to include an arcuate geometry.

In some implementations, the outer side surface of the body is spaced from the central axis at a fourth radial distance such that the body forms a fourth diameter. The fourth diameter is greater than the third diameter.

In some examples, the ramp surface of the nose portion is connected to the upper surface of the head portion at an angle. The angle is approximately equal to 120°.

In some implementations, a sealing member extends axially away from the upper surface of the body.

Another aspect of the disclosure provides an endcap assembly including an endcap and an endcap bypass plug. The endcap includes an annular body having an upper surface, a lower surface and an outer side surface joining the upper surface to the lower surface. The endcap forms an axial passage that extends through a thickness of the annular body. The axial passage defines an axial fluid-flow path. Access to the axial passage is provided by an upper opening formed by the upper surface of the annular body and a lower opening formed by the lower surface of the annular body. The endcap bypass plug is movably-arranged within the axial passage such that the endcap bypass plug is movably-connected to the endcap in one of: a sealed orientation and an unsealed orientation. A fluid flows through the axial passage from the upper surface of the endcap and beyond the lower surface of the endcap when the endcap bypass plug is movably-arranged within the axial passage in the unsealed orientation. The fluid is prevented from flowing through the axial passage from the upper surface of the endcap and beyond the lower surface of the endcap when the endcap bypass plug is movably-arranged within the axial passage in the sealed orientation.

In some examples, the endcap bypass plug forms a plurality of radial passages defining a plurality of radial fluid-flow paths. The plurality of radial passages of the endcap bypass plug cooperates with the axial passage of the endcap defining the axial fluid-flow path to form at least one fluid-flow bypass passage when the endcap bypass plug is movably-arranged within the axial passage in the unsealed orientation. The fluid flows through the at least one fluid-flow bypass passage when the endcap bypass plug is movably-arranged within the axial passage in the unsealed orientation.

In yet another aspect of the disclosure provides a filter assembly including filter media, an endcap assembly including an upper endcap and an endcap bypass plug, and a lower endcap. The filter media includes an upper end, a lower end, an outer surface and an inner surface. The endcap assembly includes an upper endcap and an endcap bypass plug movably-connected to the endcap in one of: a sealed orientation and an unsealed orientation. The upper endcap is disposed adjacent the upper end of the filter media. The lower endcap is disposed adjacent the lower end of the filter media.

In some examples, the upper endcap includes an annular body having an upper surface, a lower surface and an outer side surface joining the upper surface to the lower surface. The upper endcap forms an axial passage that extends through a thickness of the annular body. The axial passage defines an axial fluid-flow path. Access to the axial passage is provided by an upper opening formed by the upper surface of the annular body and a lower opening formed by the lower surface of the annular body. The endcap bypass plug is movably-arranged within the axial passage such that the endcap bypass plug is movably-connected connected to the upper endcap in one of: the sealed orientation and the unsealed orientation.

In some implementations, a fluid flows through the axial passage from the upper surface of the upper endcap and beyond the lower surface of the upper endcap when the endcap bypass plug is movably-arranged within the axial passage in the unsealed orientation. The fluid is prevented from flowing through the axial passage from the upper surface of the upper endcap and beyond the lower surface of the upper endcap when the endcap bypass plug is movably-arranged within the axial passage in the sealed orientation.

In some examples, the endcap bypass plug forms a plurality of radial passages defining a plurality of radial fluid-flow paths. The plurality of radial passages of the endcap bypass plug cooperates with the axial passage of the upper endcap defining the axial fluid-flow path to form at least one fluid-flow bypass passage when the endcap bypass plug is movably-arranged within the axial passage in the unsealed orientation. The fluid flows through the at least one fluid-flow bypass passage when the endcap bypass plug is movably-arranged within the axial passage in the unsealed orientation.

One aspect of the disclosure provides a method including a filter assembly having an endcap assembly. The endcap assembly includes an endcap and an endcap bypass plug that is movably-arranged within an axial passage of the endcap such that the endcap bypass plug is movably-arranged in one of a sealed orientation and an unsealed orientation with respect to the endcap. The filter assembly is arranged within a cavity of an enclosure including a canister and a cover. The canister includes a bypass valve that engages the endcap bypass plug for exerting a biasing force upon the endcap bypass plug for biasing the endcap bypass plug in the sealed orientation with respect to the endcap without the bypass valve directly engaging the endcap.

In some examples, the method includes the steps of flowing an unfiltered fluid into the cavity of the enclosure by way of an inlet port; filtering impurities from the unfiltered fluid by passing the unfiltered fluid through filter media of the filter assembly from an exterior surface of the filter media to an inner surface of the filter media; and flowing the filtered fluid out of the cavity of the enclosure by way of an outlet port.

In some implementations, upon the filter media being clogged with the impurities, the method includes the step of flowing the unfiltered fluid from the inlet port and into the cavity for arrangement about the endcap assembly including the endcap bypass plug for imparting an unfiltered fluid force to the endcap bypass plug that is opposite the biasing force applied to the endcap bypass plug by the bypass valve.

In some examples, upon the unfiltered fluid force becoming greater than the biasing force applied to the endcap bypass plug by the bypass valve, utilizing the unfiltered fluid for urging the endcap bypass plug within the axial passage of the endcap away from being biased by the bypass valve in the sealed orientation such that the endcap bypass plug is movably-arranged in the unsealed orientation for flowing the unfiltered fluid along a fluid-flow bypass passage defined by the endcap assembly and out of the cavity of the enclosure by way of the outlet port.

In some implementations, the step of flowing the unfiltered fluid along the fluid-flow bypass passage includes the steps of: axially flowing the unfiltered fluid along an axial flow path defined by the axial passage of the endcap; and radially flowing the unfiltered fluid along a radial flow path defined by at least one radial passage of the endcap bypass plug.

DETAILED DESCRIPTION

The figures illustrate an exemplary implementation of an endcap bypass plug, endcap assembly and a filter assembly. Based on the foregoing, it is to be generally understood that the nomenclature used herein is simply for convenience and the terms used to describe the invention should be given the broadest meaning by one of ordinary skill in the art.

Figure 2:
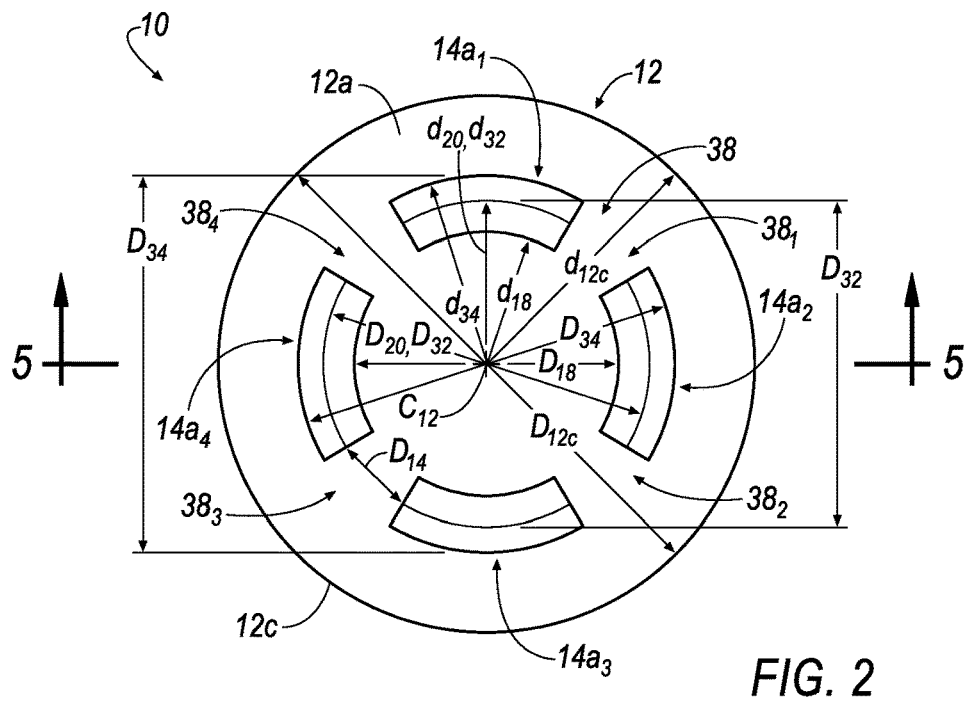
FIG. 2 is a top view of the endcap bypass plug of FIG. 1.
Figure 3:
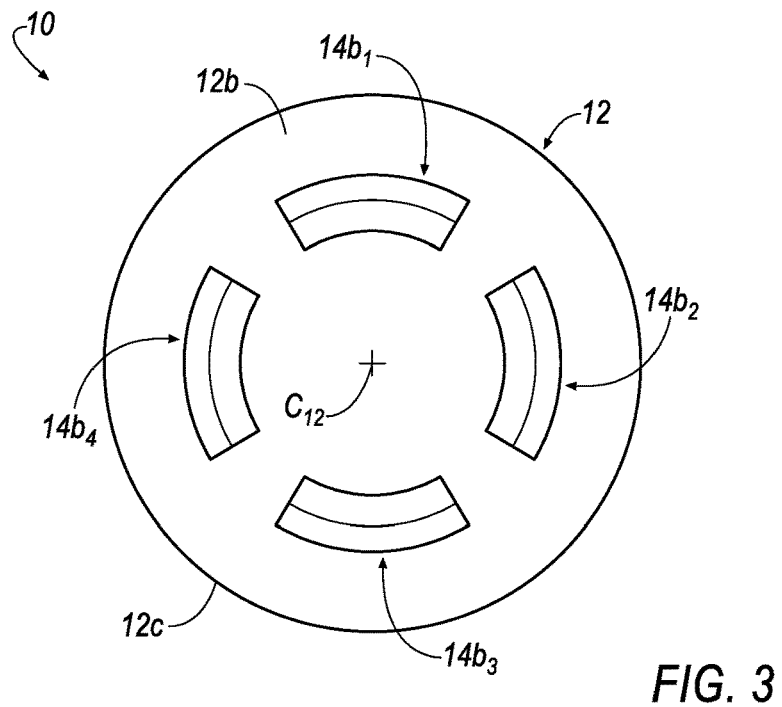
FIG. 3 is a bottom view of the endcap bypass plug of FIG. 1.

FIGS. 1-5 illustrate an exemplary implementation of an endcap bypass plug, which is shown generally at 10. Referring to FIG. 1, the endcap bypass plug 10 includes an annular body 12 having an upper surface 12a, a lower surface 12b and an outer side surface 12c joining the upper surface 12a to the lower surface 12b. The outer side surface 12c of the annular body 12 may define a dimension (e.g., a diameter, $D_{12c}$, as seen in FIG. 2) of the endcap bypass plug 10. A central axis, A-A, may axially extend through an axial center, $C_{12}$, of the annular body 12 of the bypass plug 10.

Leg members 14 may be integral with and extend away from one or more of the upper surface 12a and the lower surface 12b of the annular body 12. The leg members 14 may include at least one upper leg member 14a and at least one lower leg member 14b. The at least one upper leg member 14a may extend from the upper surface 12a of the annular body 12. The at least one lower leg member 14b may extend from the lower surface 12b of the annular body 12. In an implementation the at least one leg member 14a, 14b may be defined to respectively include four upper leg members $14a_1$-$14a_4$ and four lower leg members $14b_1$-$14b_4$. Although the endcap bypass plug 10 is described to include leg members 14 having at least one upper leg member 14a and at least one lower leg member 14b, in some implementations, the at least one lower leg member 14b may be omitted from the design of the endcap bypass plug 10.

In an implementation, each leg member $14a_1$-$14a_4$ of the at least one upper leg member 14a may include a flexible stem portion 16 that extends away from the upper surface 12a of the annular body 12. Each flexible stem portion 16 may include an inwardly-facing surface 18 and an outwardly-facing surface 20. The inwardly-facing surface 18 and the outwardly-facing surface 20 defines each flexible stem portion 16 to include an arcuate shape. In an implementation, each leg member $14b_1$-$14b_4$ of the at least one lower leg member 14b includes a substantially similar dimension to the flexible stem portion 16 as described above.

The inwardly-facing surface 18 of each flexible stem portion 16 may be equally spaced from the central axis, A-A, extending through the axial center, $C_{12}$, of the annular body 12 at a radius/radial distance, $d_{18}$ (as seen in, e.g., FIG. 2). As a result, if the inwardly-facing surface 18 of each leg member $14a_1$-$14a_4$ is equally spaced from the central axis, A-A, at the radial distance, $d_{18}$, and are arranged in a circular orientation, collectively, the inwardly-facing surface 18 of each leg member $14a_1$-$14a_4$ of the at least one upper leg member 14a may define a dimension (e.g., a diameter, $D_{18}$, as seen in FIG. 2) of the endcap bypass plug 10. In an implementation, each leg member $14b_1$-$14b_4$ of the at least one lower leg member 14b include a substantially similar dimension to the inwardly-facing surface 18 as described above.

The outwardly-facing surface 20 of each flexible stem portion 16 may be equally spaced from the central axis, A-A, extending through the axial center, $C_{12}$, of the annular body 12 at a radius/radial distance, $d_{20}$ (as seen in, e.g., FIG. 2). As a result, if the outwardly-facing surface 20 of each leg member $14a_1$-$14a_4$ is equally spaced from the central axis, A-A, at the radial distance, $d_{20}$, and are arranged in a circular orientation, collectively, the outwardly-facing surface 20 of each leg member $14a_1$-$14a_4$ of the at least one upper leg member 14a may define a dimension (e.g., a diameter, $D_{20}$, as seen in FIG. 2) of the endcap bypass plug 10. In an implementation, each leg member $14b_1$-$14b_4$ of the at least one lower leg member 14b include a substantially similar dimension to the outwardly-facing surface 20 as described above.

Each flexible stem portion 16 terminates with a head portion 22. The head portion 22 includes an upper surface 24. The upper surface 24 defines each head portion 22 to include an arcuate shape. In an implementation, each leg member $14b_1$-$14b_4$ of the at least one lower leg member 14b include a substantially similar dimension to the head portion 22 as described above.

The head portion 22 may further include a nose portion 26 that extends radially outwardly from each head portion 22. In an implementation, the nose portion 26 may be defined by a ramp surface 28 and a lower surface 30. The ramp surface 28 and the lower surface 30 define each nose portion 26 to include an arcuate shape. In an implementation, each leg member $14b_1$-$14b_4$ of the at least one lower leg member 14b includes a substantially similar dimension to the nose portion 26 as described above.

The ramp surface 28 of the nose portion 26 is connected to the upper surface 24 of the head portion 22 to define an upper edge 32. The upper edge 32 may be arcuately-shaped. The upper edge 32 of each nose portion 26 of each leg member $14a_1$-$14a_4$ of the at least one upper leg member 14a may be equally spaced from the central axis, A-A, extending through the axial center, $C_{12}$, of the annular body 12 at a radius/radial distance, $d_{32}$ (as seen in, e.g., FIG. 2); as a result, if the upper edge 32 of each leg member $14a_1$-$14a_4$ is equally spaced from the central axis, A-A, at the radial distance, $d_{32}$, and are arranged in a circular orientation, collectively, the upper edges 32 each leg member $14a_1$-$14a_4$ of the at least one upper leg member 14a may define a dimension (e.g., a diameter, $D_{32}$, as seen in FIG. 2) of the endcap bypass plug 10. In some implementations, the diameter, $D_{20}$, defined by the outwardly-facing surface 20 of each leg member $14a_1$-$14a_4$ of the at least one upper leg member 14a may be approximately equal to the diameter, $D_{32}$, defined by the upper edges 32 each leg member $14a_1$-$14a_4$ of the at least one upper leg member 14a. In an implementation, each leg member $14b_1$-$14b_4$ of the at least one lower leg member 14b may include a substantially similar dimension to the upper edge 32 as described above.

Figure 5:
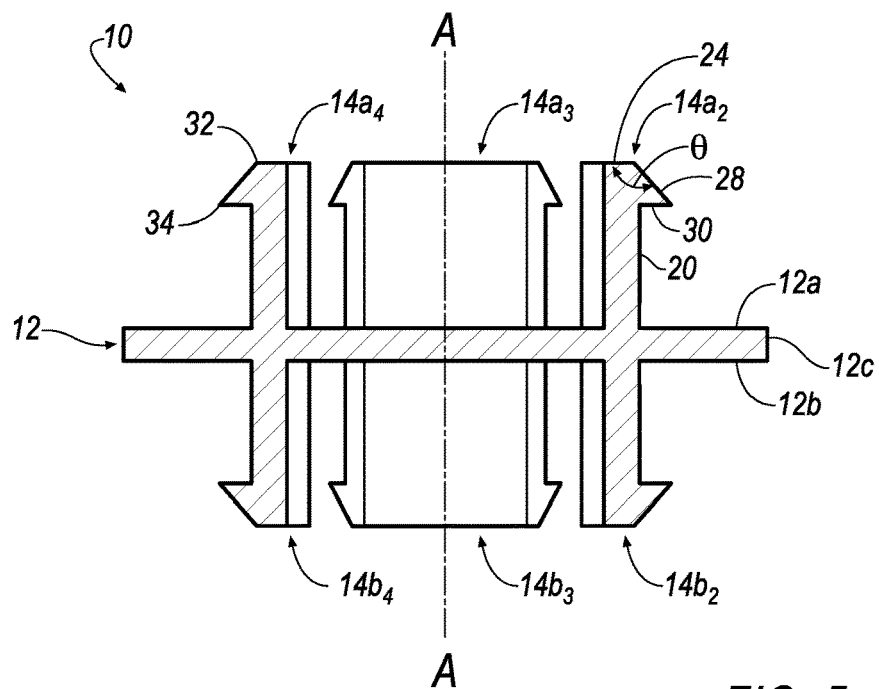
FIG. 5 is a cross-sectional view of the endcap bypass plug according to line 5-5 of FIG. 2.
Figure 4:
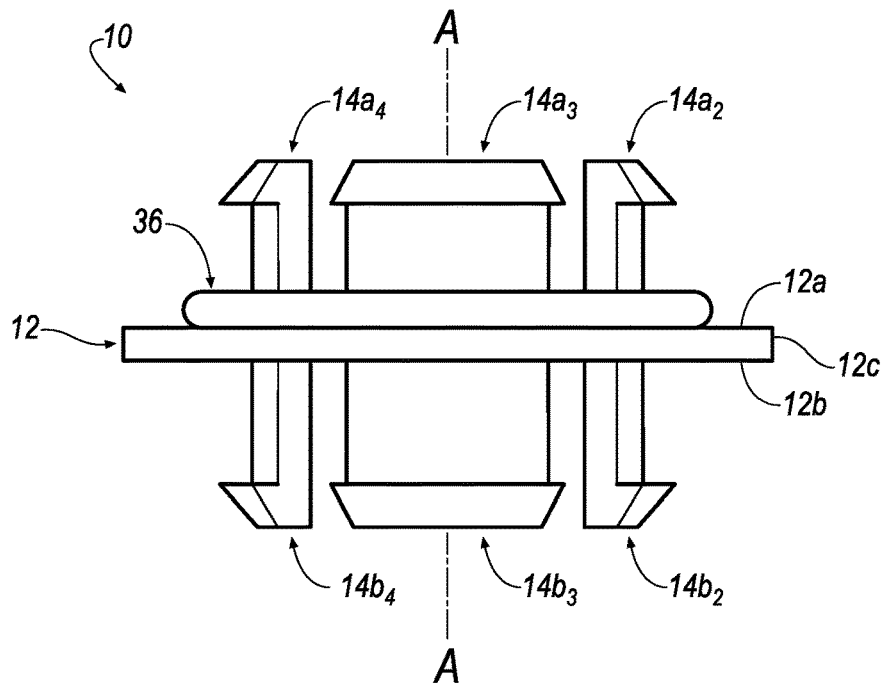
Figure 5:
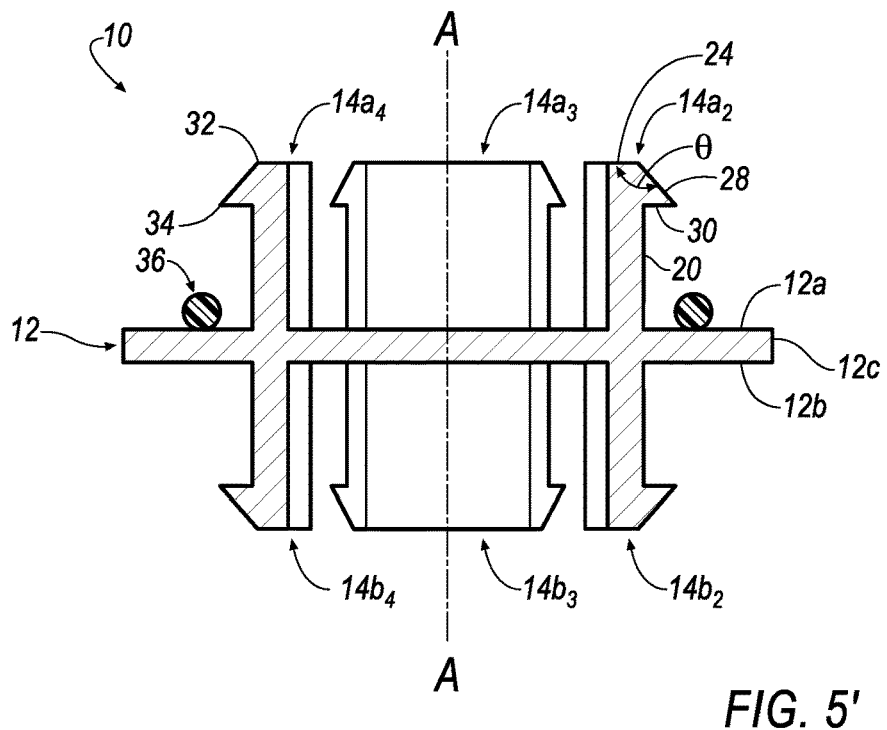

Referring to FIG. 5, in some implementations, the ramp surface 28 of the nose portion 26 is connected to the upper surface 24 of the head portion 22 at an angle, θ. In an example, the angle, θ, may be equal to approximately about 120°. In an implementation, each leg member $14b_1$-$14b_4$ of the at least one lower leg member 14b include a substantially similar dimension to the angle, θ, as described above.

With continued reference to FIG. 5, the lower surface 30 of the nose portion 26 is connected to both of the outwardly-facing surface 20 of the flexible stem portion 16 and the ramp surface 28 of the nose portion 26. In some instances, the lower surface 30 of the nose portion 26 is connected to the outwardly-facing surface 20 of the flexible stem portion 16 in a substantially perpendicular orientation.

Referring to FIG. 1, the ramp surface 28 of the nose portion 26 is connected to the lower surface 30 of the nose portion 26 to define a lower edge 34. The lower edge 34 may be arcuately-shaped. The lower edge 34 of each nose portion 26 of each leg member $14a_1$-$14a_4$ of the at least one upper leg member 14a may be equally spaced from the central axis, A-A, extending through the axial center, $C_{12}$, of the annular body 12 at a radius/radial distance, $d_{34}$ (as seen in, e.g., FIG. 2); as a result, if the lower edge 34 of each leg member $14a_1$-$14a_4$ is equally spaced from the central axis, A-A, at the radial distance, $d_{34}$, and are arranged in a circular orientation, collectively, the lower edges 34 each leg member $14a_1$-$14a_4$ of the at least one upper leg member 14a may define a dimension (e.g., a diameter, $D_{34}$, as seen in FIG. 2) of the endcap bypass plug 10. In an implementation, each leg member $14b_1$-$14b_4$ of the at least one lower leg member 14b include a substantially similar dimension to the lower edge 34 as described above.

Referring to FIG. 2, in some implementations, the four leg members $14a_1$-$14a_4$ of the at least one upper leg member 14a may each be equally spaced apart by an arcuate distance, $D_{14}$. As a result, the arcuate distance, $D_{14}$, results in neighboring leg members of the four leg members $14a_1$-$14a_4$ forming at least one radial passage 38 (i.e., four radial passages $38_1$-$38_4$) as seen in FIGS. 1-2 defining radial fluid-flow paths, $F_R$ (see, e.g., FIG. 1), there between, which are referenced from the central axis, A-A, extending through the axial center of the endcap bypass plug 10. In an implementation, each leg member $14b_1$-$14b_4$ of the at least one lower leg member 14b include a substantially similar dimension to the arcuate distance, $D_{14}$, as described above.

Figure 6:
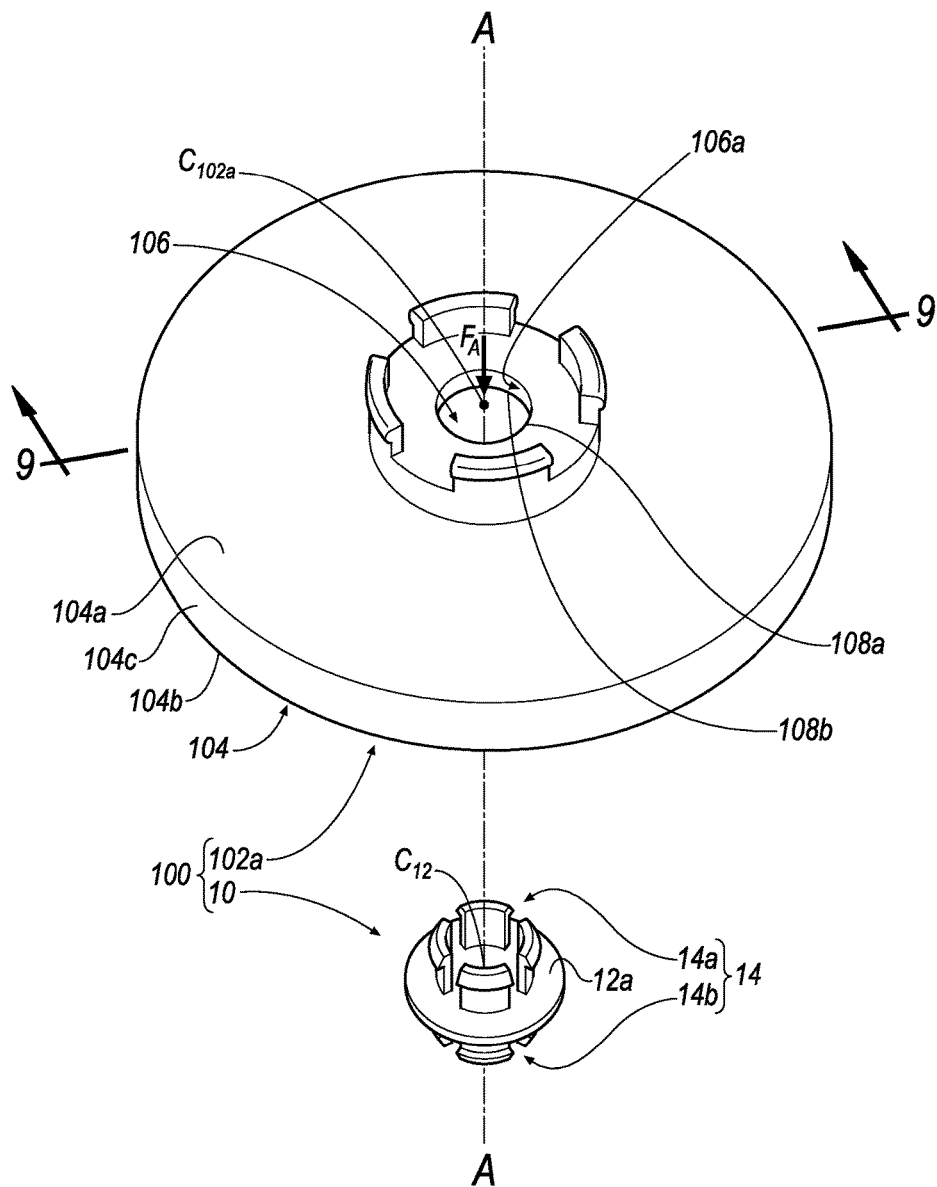
FIG. 6 is an exploded, top perspective view of an exemplary endcap assembly including the exemplary endcap bypass plug of FIG. 1.

FIGS. 6-11 illustrate an exemplary endcap assembly, which is shown generally at 100. Referring to FIG. 6, the endcap assembly 100 includes the endcap bypass plug 10 and an endcap 102a. The endcap 102a includes an annular body 104 having an upper surface 104a, a lower surface 104b and an outer side surface 104c joining the upper surface 104a to the lower surface 104b.

An axial passage 106 extends through a thickness, $T_{104}$ (see, e.g., FIG. 9A), of the annular body 104. Access to the axial passage 106 is permitted by an upper opening 108a formed by the upper surface 104a of the annular body 104 and a lower opening 108b formed by the lower surface 104b of the annular body 104.

Figure 9A:
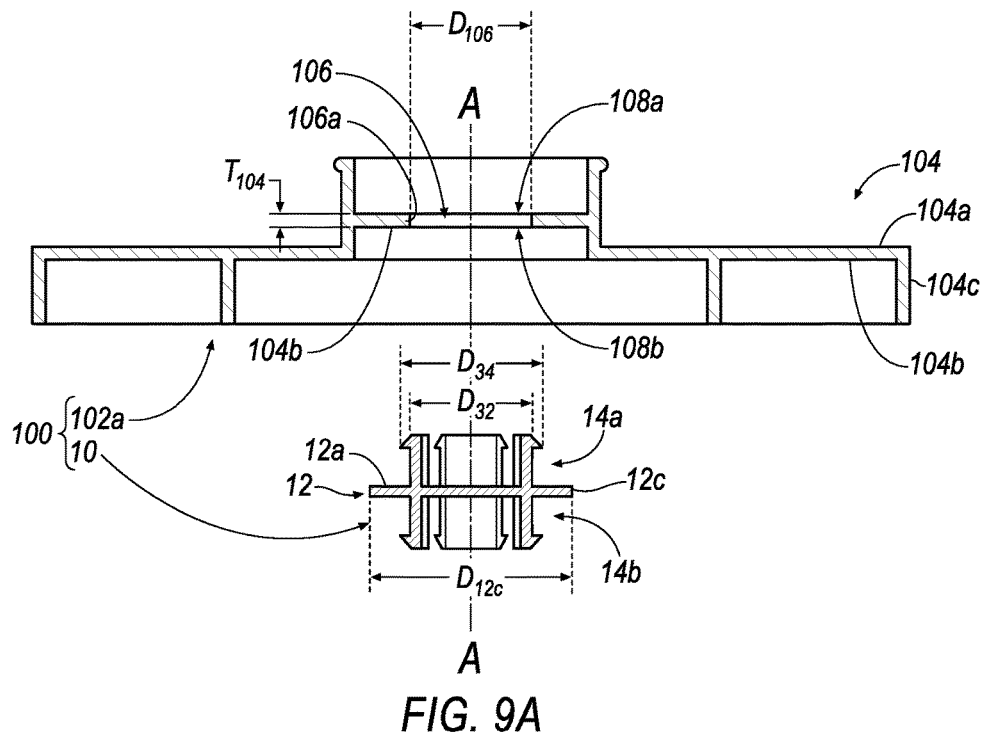
FIG. 9A is a cross-sectional view of the endcap assembly according to line 9-9 of FIG. 6.

The axial passage 106 is axially aligned with the central axis, A-A, that extends through an axial center, $C_{102a}$, of the endcap 102a and the axial center, $C_{12}$, of the endcap bypass plug 10. The axial passage 106 is defined by a passage surface 106a; the passage surface 106a defines the axial passage 106 to include a dimension (e.g., a diameter, $D_{106}$, as seen in FIG. 9A). The axial passage 106 defines an axial fluid-flow path, $F_A$, which is referenced from the central axis, A-A, extending through the axial center, $C_{102a}$, of the endcap 102a.

Figure 7:
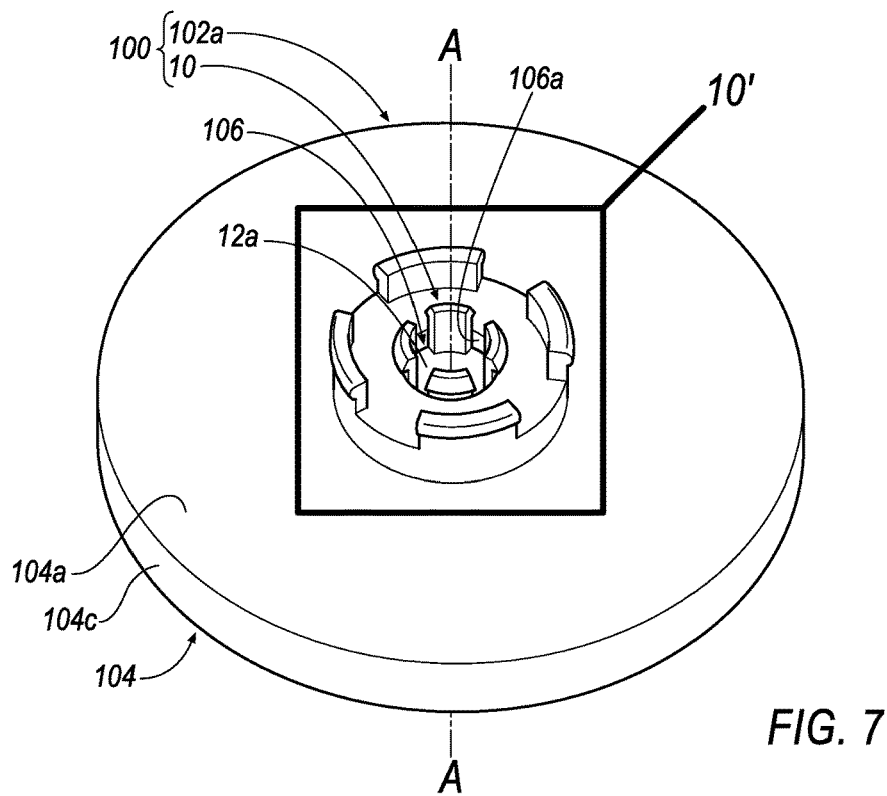
FIG. 7 is an assembled, top perspective view of the endcap assembly of FIG. 6.
Figure 8:
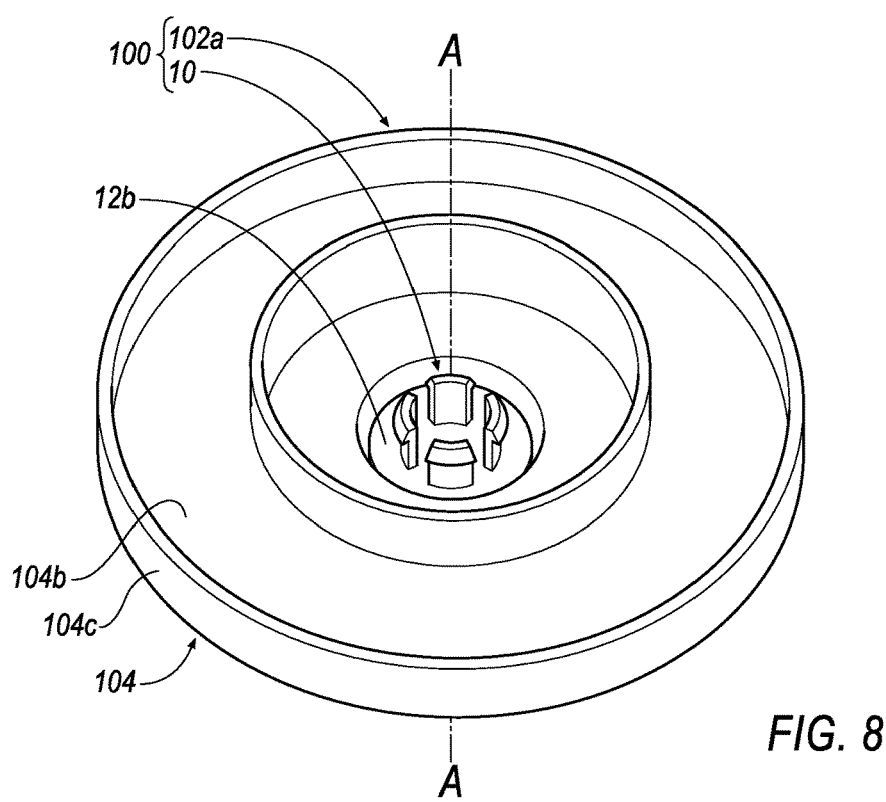
FIG. 8 is an assembled, bottom perspective view of the endcap assembly of FIG. 6.

Referring to FIGS. 6-7, the endcap bypass plug 10 is arranged within the axial passage 106 of the endcap 102a such that the endcap bypass plug 10 is movably-connected connected to the endcap 102a. The endcap bypass plug 10 is movably-arranged along the central axis, A-A, that axially extends through the axial center of each of the bypass plug 10 and the endcap 102a.

The endcap bypass plug 10 is permitted to be movably-arranged within the axial passage 106 of the endcap 102a in order to configure the endcap assembly 100 to be arranged in one of at least two orientations. The first orientation may be a fluidly unsealed orientation (see, e.g., FIGS. 9D, 11 and 11'), and, the second orientation may be a fluidly sealed orientation (see, e.g., FIGS. 7-8, 9C, 10 and 10').

Figure 11:
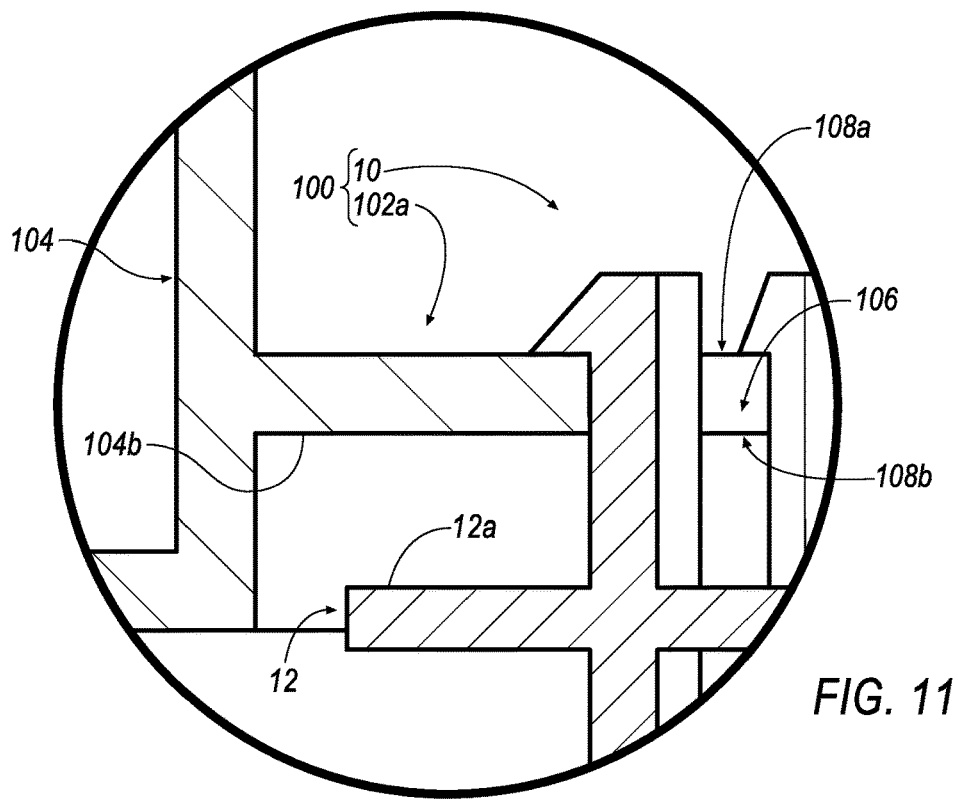
FIG. 11 is an enlarged view of the endcap assembly in the assembled, unsealed orientation according to line 11 of FIG. 9D.
Figure 10:
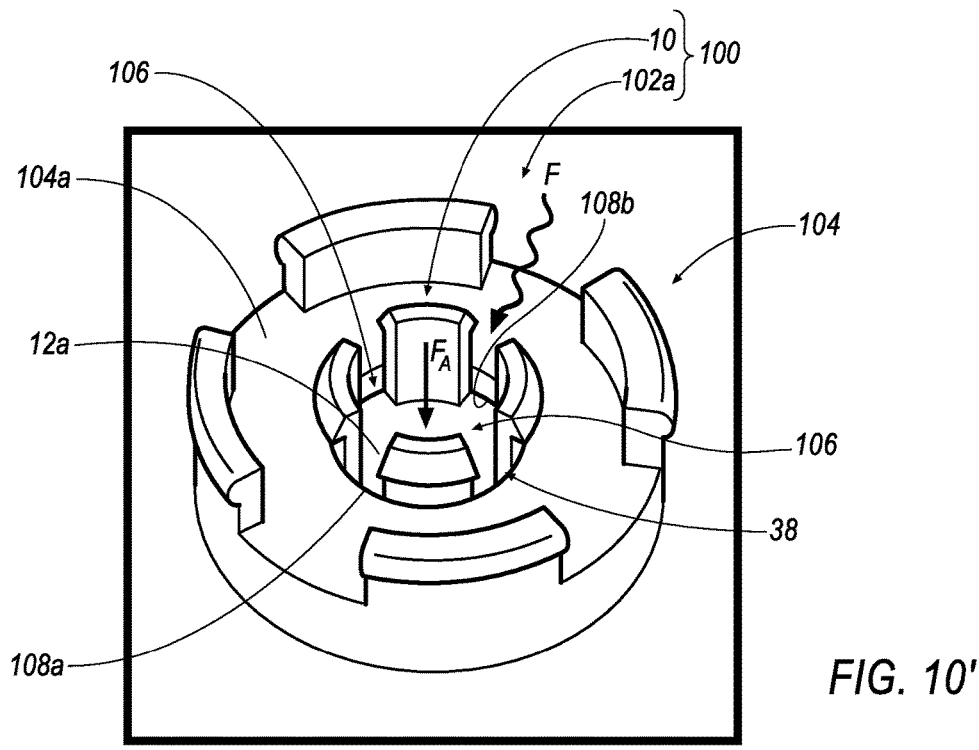
Figure 11:
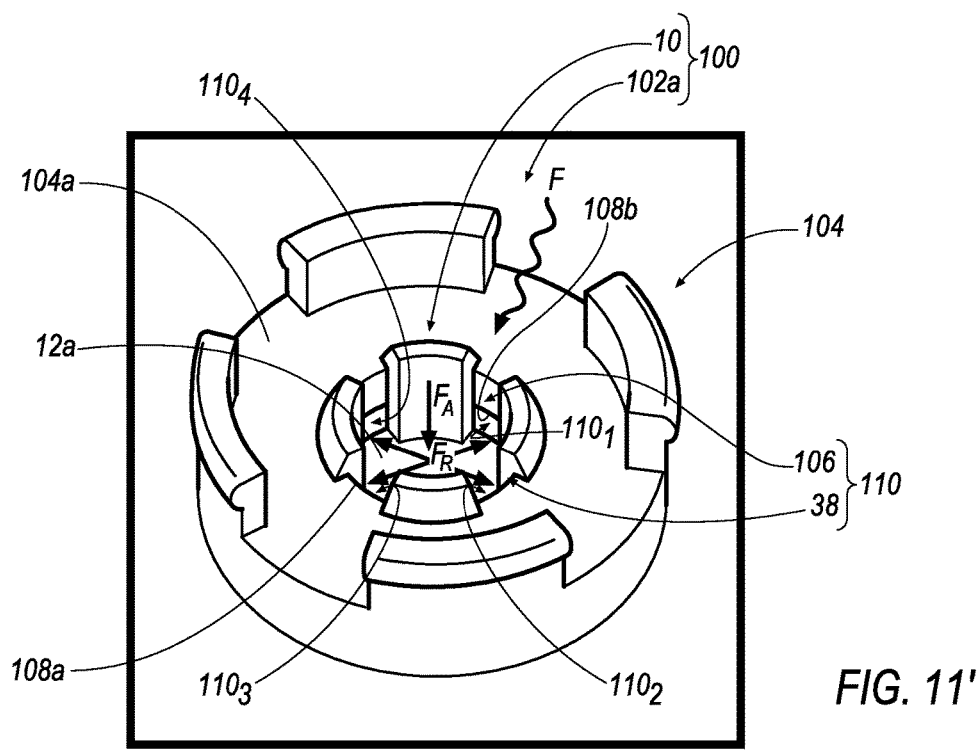

As seen, for example, in FIG. 11, the unsealed orientation of the endcap assembly 100 is defined by/realized when the upper surface 12a of the annular body 12 of the endcap bypass plug 10 is arranged in an opposing, spaced-apart relationship with respect to the lower surface 104b of the annular body 104 of the endcap 102a; referring to FIG. 11', when arranged in such an orientation, a fluid, F, is permitted to flow: (1) from about the upper surface 104a of the annular body 104 of the endcap 102a, (2) into the upper opening 108a formed by the upper surface 104a of the endcap 102a, (3) axially through the axial passage 106 along the axial fluid-flow path, $F_A$, (4) out of the lower opening 108b formed by the lower surface 104b of the endcap 102a, (5) radially through the at least one radial passage 38 and beyond the outwardly-facing surface 20 of the stem portion 16 along the radial fluid-flow path, $F_R$, and (6) about the lower surface 104b of the annular body 104 of the endcap 102a. As a result of the cooperation of the axial passage 106 of the endcap 102a and the at least one radial passage 38 of the endcap bypass plug 10, collectively, the axial passage 106 and the at least one radial passage 38 may define the endcap assembly 100 to include at least one fluid-flow bypass passages 110 (i.e., four fluid-flow bypass passages $110_1$-$110_4$).

Figure 10:
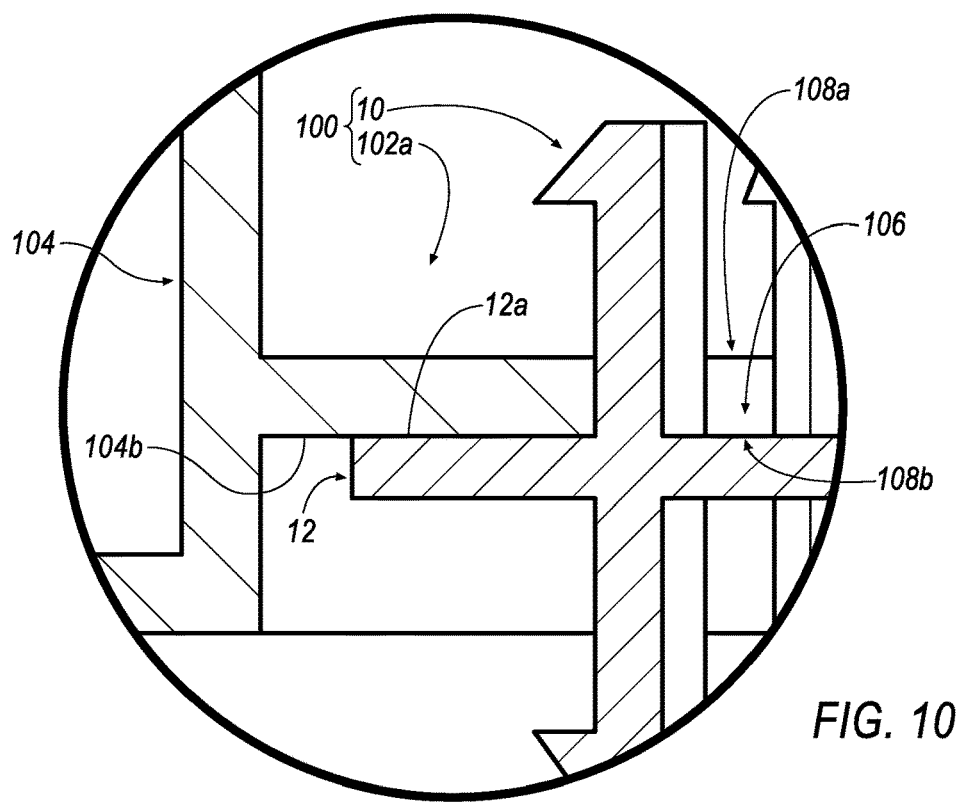
FIG. 10 is an enlarged view of the endcap assembly in the assembled, sealed orientation according to line 10 of FIG. 9C.

As seen, for example, in FIG. 10, the sealed orientation of the endcap assembly 100 is defined by/realized when the upper surface 12a of the annular body 12 of the endcap bypass plug 10 is arranged in an adjacent relationship with the lower surface 104b of the annular body 104 of the endcap 102a while also closing-out and fluidly-sealing the lower opening 108b formed by the lower surface 104b of the endcap 102a; referring to FIG. 10', when arranged in such an orientation, the fluid, F, is only permitted to flow: (1) from about the upper surface 104a of the annular body 104 of the endcap 102a, (2) into the upper opening 108a formed by the upper surface 104a of the endcap 102a, and (3) axially into the axial passage 106 along the axial fluid-flow path, $F_A$. However, once the fluid, F, is arranged within the axial passage 106, the fluid, F, is not permitted to subsequently flow: (4) out of the lower opening 108b formed by the lower surface 104b of the endcap 102a and (5) radially through the at least one radial passage 38 along the radial fluid-flow path, $F_R$, and beyond the outwardly-facing surface 20 of the stem portion 16 due to the upper surface 12a of the annular body 12 of the endcap bypass plug 10 closing-out and fluidly-sealing the lower opening 108b formed by the lower surface 104b of the endcap 102a. Therefore, the fluid, F, is not permitted to be arranged (6) about the lower surface 104b of the annular body 104 of the endcap 102a, and, as a result, the fluid, F, remains: (6a) about the upper surface 104a of the annular body 104 of the endcap 102a, and (6b) with the axial passage 106 of the endcap 102a.

Figure 4:
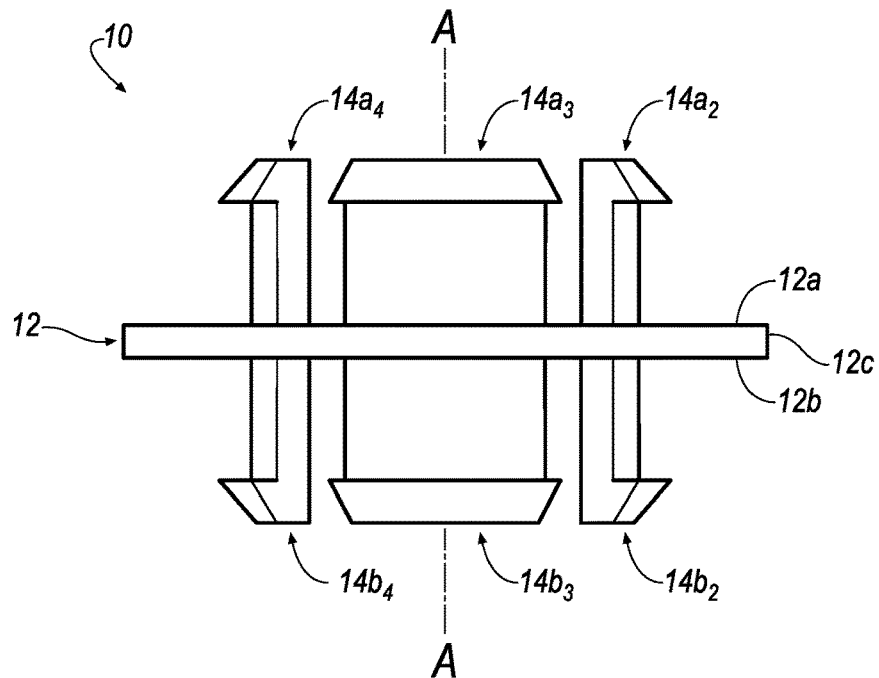
FIG. 4 is a side view of the endcap bypass plug of FIG. 1.

Referring to FIGS. 4' and 5', in some implementations, the upper surface 12a of the annular body 12 of the endcap bypass plug 10 may include a sealing member 36 (such as, e.g., an o-ring seal). In such an implementation, the sealing member 36 may be arranged in an adjacent relationship with the lower surface 104b of the annular body 104 of the endcap 102a when the endcap assembly 100 is arranged in the sealed orientation; as a result, the sealing member 36 may fluidly-seal the lower opening 108b formed by the lower surface 104b of the endcap 102a while the upper surface 12a of the annular body 12 of the endcap bypass plug 10 closes-out the lower opening 108b formed by the lower surface 104b of the endcap 102a when the endcap assembly 100 is arranged in the sealed orientation.

Although an implementation of the endcap bypass plug 10 is described above to include the sealing member 36, implementations of the endcap bypass plug 10 not including the sealing member 36 (as seen in, e.g., FIGS. 4 and 5) may adequately seal and close-out the lower opening 108b formed by the lower surface 104b of the endcap 102a when the endcap assembly 100 is arranged in the sealed orientation. For example, if the endcap bypass plug 10 does not include the sealing member 36 as described in FIGS. 4 and 5, the entire endcap bypass plug 10 may be formed from a material consistent with the material that is utilized for forming the sealing member 36. In other implementations, if the endcap bypass plug 10 does not include the sealing member 36 as described in FIGS. 4 and 5, at least a portion of the upper surface 12a of the annular body 12 of the endcap bypass plug 10 may be formed from a material consistent with the material that is utilized for forming the sealing member 36. As a result, when the endcap bypass plug 10 does not include the sealing member 36, the upper surface 12a of the annular body 12 will provide an effective seal when the upper surface 12a of the annular body 12 of the endcap bypass plug 10 is arranged adjacent the lower surface 108 of the endcap 102a.

Prior to describing an embodiment for assembling the endcap assembly 100, an exemplary relative geometry of the endcap bypass plug 10 and the endcap 102a is described below. Referring to FIG. 9A, in an example, the diameter, $D_{106}$, of the axial passage 106 is less than the diameter, $D_{12c}$, defined by the outer side surface 12c of the annular body 12 of the endcap bypass plug 10. The diameter, $D_{106}$, of the axial passage 106 may be approximately equal to but slightly greater than the diameter, $D_{32}$, defined by the upper edges 32 each leg member $14a_1$-$14a_4$ of the endcap bypass plug 10. The diameter, $D_{106}$, of the axial passage 106 may be approximately equal to but slightly less than the diameter, $D_{34}$, defined by the lower edges 34 each leg member $14a_1$-$14a_4$ of the endcap bypass plug 10.

The endcap assembly 100 may be assembled according to the following implementation. Firstly, as seen in FIG. 9A, each leg member $14a_1$-$14a_4$ of the at least one upper leg member 14a of the endcap bypass plug 10 may be arranged in an opposing relationship with respect to the lower opening 108b formed by the lower surface 104b of the endcap 102a such that the diameter, $D_{32}$, defined by defined by the upper edges 32 each leg member $14a_1$-$14a_4$ of the endcap bypass plug 10 is aligned with the diameter, $D_{106}$, of the axial passage 106.

Figure 9B:
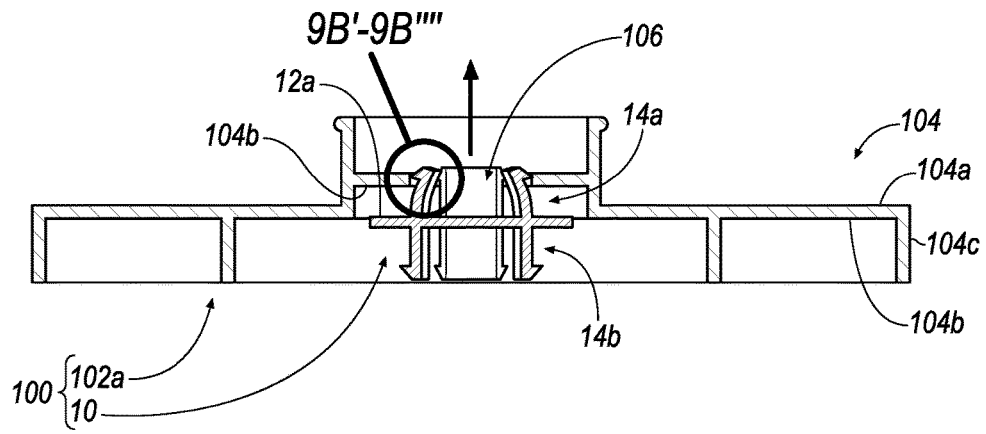
FIG. 9B is another cross-sectional view of the endcap assembly according to FIG. 9A showing the endcap assembly in a partially assembled orientation.
Figure 9B:
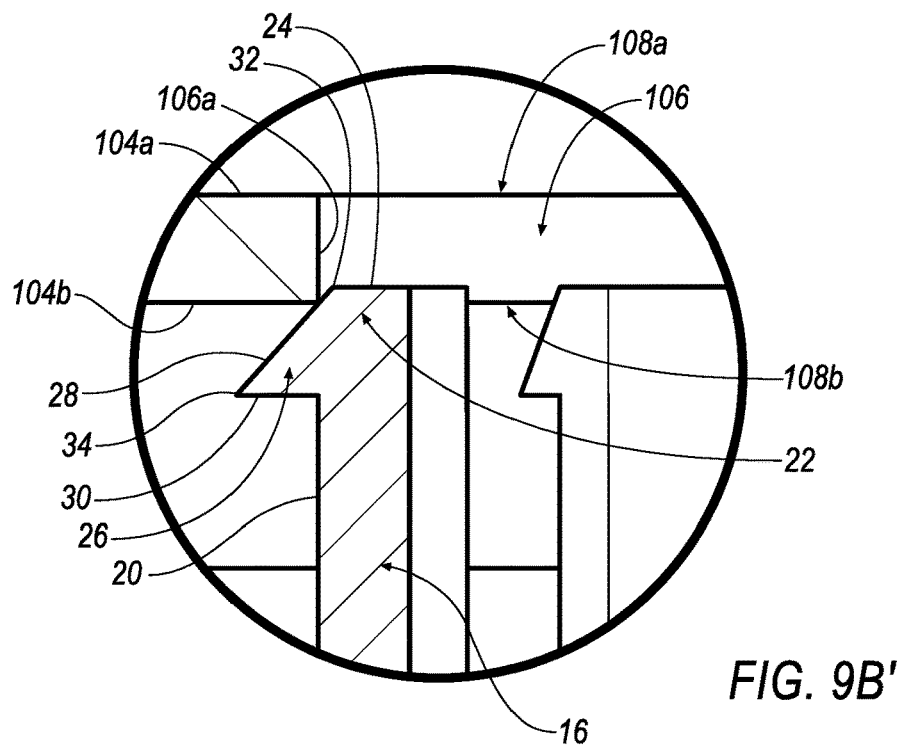
Figure 9B:
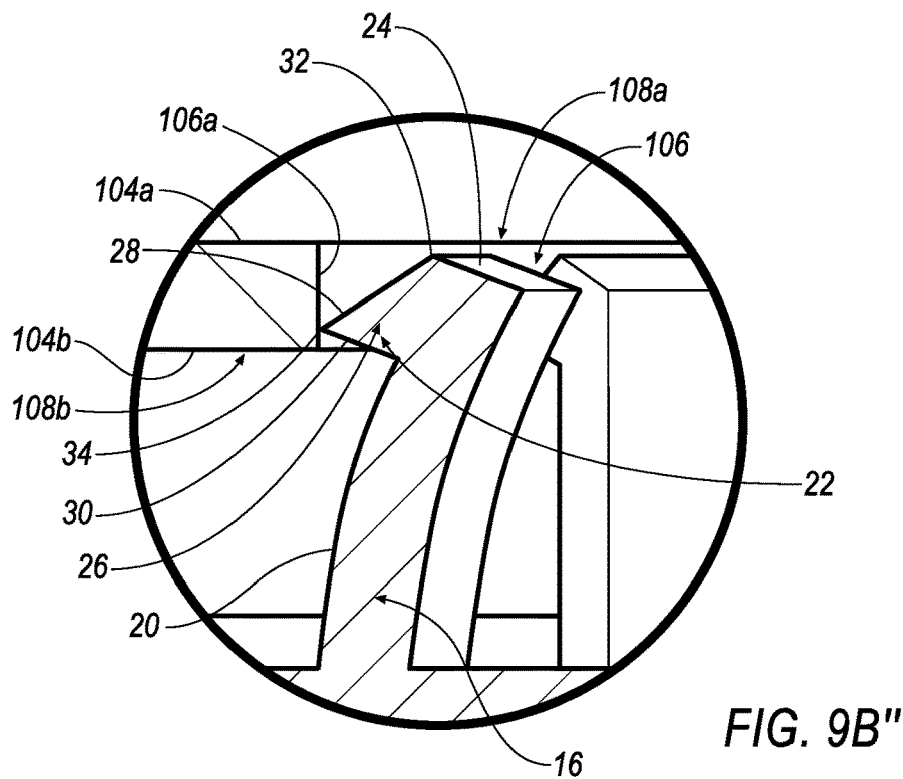
Figure 9C:
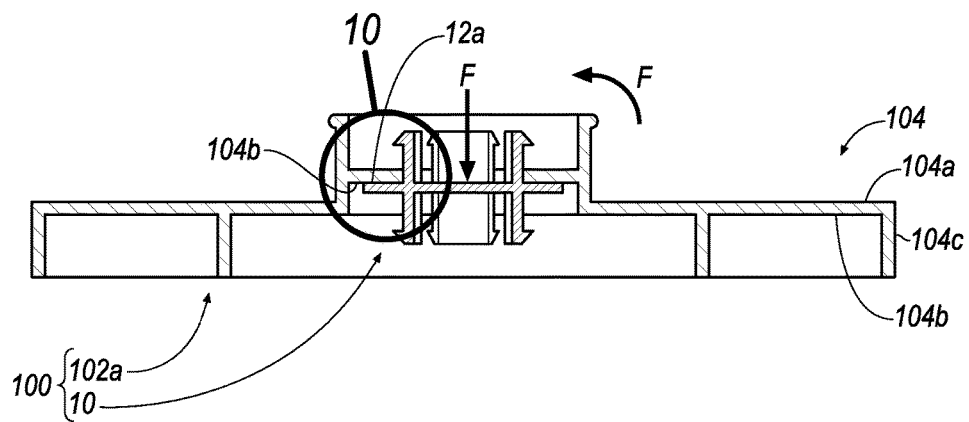
FIG. 9C is another cross-sectional view of the endcap assembly according to FIG. 9B showing the endcap assembly in an assembled, sealed orientation.
Figure 9D:
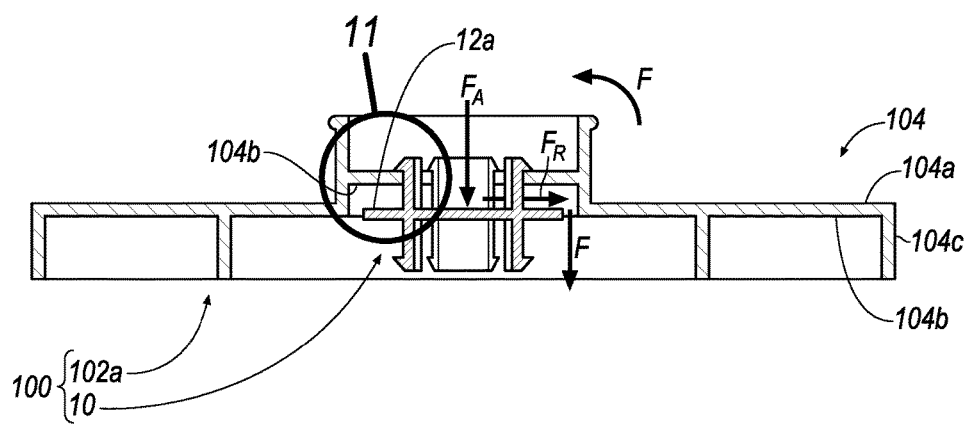
FIG. 9D is another cross-sectional view of the endcap assembly according to FIG. 9B showing the endcap assembly in an assembled, unsealed orientation.

Then, as seen in FIG. 9B, each leg member $14a_1$-$14a_4$ of the at least one upper leg member 14a is inserted through the lower opening 108b and into the axial passage 106. Referring to FIG. 9B', because the diameter, $D_{34}$, defined by the lower edges 34 each leg member $14a_1$-$14a_4$ of the endcap bypass plug 10 is approximately equal to but slightly greater than the diameter, $D_{106}$, of the axial passage 106, the ramp surface 28 of the nose portion 26 engages the lower opening 108b formed by the lower surface 104b of the endcap 102a; as a result, referring to FIG. 9B", each leg member $14a_1$-$14a_4$ of the at least one upper leg member 14a may flexibly-deflect from an unbiased, at-rest orientation (as seen in, e.g., FIGS. 9A, 9B') to a radially inwardly biased orientation (as seen in, e.g., FIGS. 9B, 9B", 9B''') toward the central axis, A-A, as the ramp surface 28 of the nose portion 26 of each leg members $14a_1$-$14a_4$ of the at least one upper leg member 14a engages the lower opening 108b (i.e., as seen in at least FIG. 9B'''. Referring to FIG. 9B", once the ramp surface 28 of the nose portion 26 of each leg members $14a_1$-$14a_4$ of the at least one upper leg member 14a is advanced through the axial passage 106 and beyond the lower opening 108b, the diameter, $D_{34}$, defined by the lower edges 34 of each leg member $14a_1$-$14a_4$ of the at least one upper leg member 14a is temporarily upset to be approximately the same as the diameter, $D_{106}$, defined by the axial passage 106 when each leg members $14a_1$-$14a_4$.

Referring to FIGS. 9B"-9B''', once the ramp surface 28 of the nose portion 26 of each leg members $14a_1$-$14a_4$ of the at least one upper leg member 14a is advanced for arrangement within the axial passage 106 and beyond the lower opening 108b, the lower edge 34 of each leg member $14a_1$-$14a_4$ of the at least one upper leg member 14a of the endcap bypass plug 10 may engage the passage surface 106a of the axial passage 106. When the lower edge 34 of each leg member $14a_1$-$14a_4$ of the at least one upper leg member 14a of the endcap bypass plug 10 engages the passage surface 110, each leg members $14a_1$-$14a_4$ of the at least one upper leg member 14a may remain in the flexibly-deflected radially inwardly biased orientation.

As seen in FIG. 9B'''', the endcap bypass plug 10 may be said to be slidably-attached to the endcap 102a once the lower edge 34 of each leg member $14a_1$-$14a_4$ of the at least one upper leg member 14a has been inserted through the axial passage 106 and beyond the upper opening 108a formed by the upper surface 104a of the annular body 104 of the endcap 102a. Once the lower edge 34 of each leg member $14a_1$-$14a_4$ of the at least one upper leg member 14a is arranged beyond the upper opening 108a, each leg member $14a_1$-$14a_4$ of the at least one upper leg member 14a flexibly-deflects radially outwardly away from the central axis, A-A (i.e., each leg member $14a_1$-$14a_4$ of the at least one upper leg member 14a flexibly-deflects from the radially inwardly biased orientation back to the unbiased, at-rest orientation).

Once each leg member $14a_1$-$14a_4$ of the at least one upper leg member 14a is returned to the unbiased, at-rest orientation, the diameter, $D_{34}$, defined by the lower edges 34 of each leg member $14a_1$-$14a_4$ of the at least one upper leg member 14a is returned to being greater than the diameter, $D_{106}$, of the axial passage 106 of the endcap 102a; as a result, at least the head portion 22 and the nose portion 26 of each leg member $14a_1$-$14a_4$ the endcap bypass plug 10 are prevented from re-entering the axial passage 106, thereby inhibiting the endcap bypass plug 10 from being slidably-disconnected from the endcap 102a (i.e. the lower surface 30 of the nose portion 26 of each leg member $14a_1$-$14a_4$ may be arranged adjacent the upper surface 114 of the endcap 102a and prevents at least the head portion 22 and nose portion 26 from entering the axial passage 106).

The slidable attachment of the endcap bypass plug 10 to the endcap 102a may be realized as a result of the relative dimensions (i.e., the diameters, $D_{12c}$, $D_{20}$, $D_{34}$) of the of the endcap bypass plug 10 with respect to the diameter, $D_{106}$, defined by the axial passage 106 formed by the endcap 102a. Firstly, as a result of the diameters, $D_{12c}$, $D_{34}$, defined by the lower edges 34 of each leg member $14a_1$-$14a_4$ and the outer side surface 12c of the annular body 12 of the endcap bypass plug 10 being greater than the diameter, $D_{106}$, defined by the axial passage 106 formed by the endcap 102a, the head portion 22 and the nose portion 26 of each leg member $14a_1$-$14a_4$ of the endcap bypass plug 10 and the annular body 12 of the endcap bypass plug 10 are prevented from entering into the axial passage 106 and thereby prevents the endcap bypass plug 10 from being detached from the endcap 102a. Secondly, the slidable orientation of the endcap bypass plug 10 with respect to the endcap 102a is permitted as a result of the diameter, $D_{20}$, defined by the outwardly-facing surface 20 of each flexible stem portion 16 of each leg member $14a_1$-$14a_4$ being approximately equal to but slightly less than the diameter, $D_{106}$, defined by the axial passage 106. As a result, the outwardly-facing surface 20 of each leg member $14a_1$-$14a_4$ may be slidably-disposed adjacent the passage surface 106a of the axial passage 106. In some implementations, because the diameter, $D_{20}$, defined by the outwardly-facing surface 20 of each leg member $14a_1$-$14a_4$ is approximately equal to but slightly less than the diameter, $D_{106}$, defined by the axial passage 106, the outwardly-facing surface 20 may frictionally engage the passage surface 106a of the axial passage 106.

Figure 14:
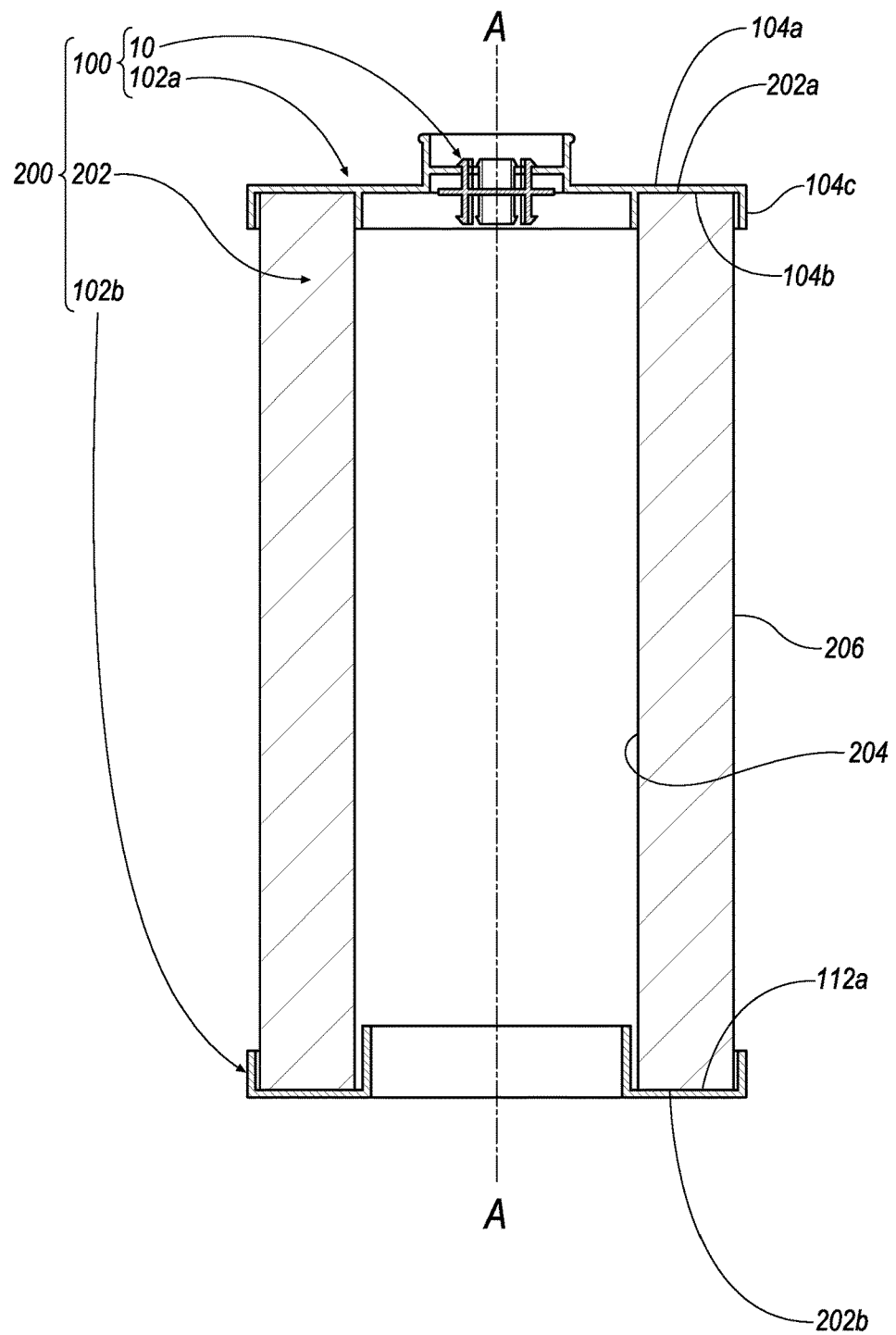
FIG. 14 is a cross-sectional view of the filter assembly according to line 14-14 of FIG. 13.

FIGS. 12-14 illustrate an exemplary implementation of a filter assembly, which is shown generally at 200. The filter assembly 200 includes filter media 202 that is arranged between the endcap 102a of the endcap assembly 100 and an endcap 102b.

The endcap 102a of the endcap assembly 100 may hereinafter be referred to as a "first endcap" or an "upper endcap." A portion of the lower surface 104b of the upper endcap 102a is disposed adjacent an upper end/distal end 202a of the filter media 202.

The endcap 102b may hereinafter be referred to as a "second endcap" or a "lower endcap." An upper surface 112a of the lower endcap 102b is disposed adjacent a lower end/proximal end 202b of the filter media 202.

Any desirable material, such as, for example, an adhesive, may be utilized for joining: (1) the portion of the lower surface 104b of the upper endcap 102a adjacent the upper distal end 202a of the filter media 202, and (2) the upper surface 112a of the lower endcap 102b adjacent the proximal end 202b of the filter media 202. The central axis, A-A, may axially extend through an axial center of each of: the endcap bypass plug 10, the upper endcap 102a and the lower endcap 102b and the filter media 202.

Figure 15A:
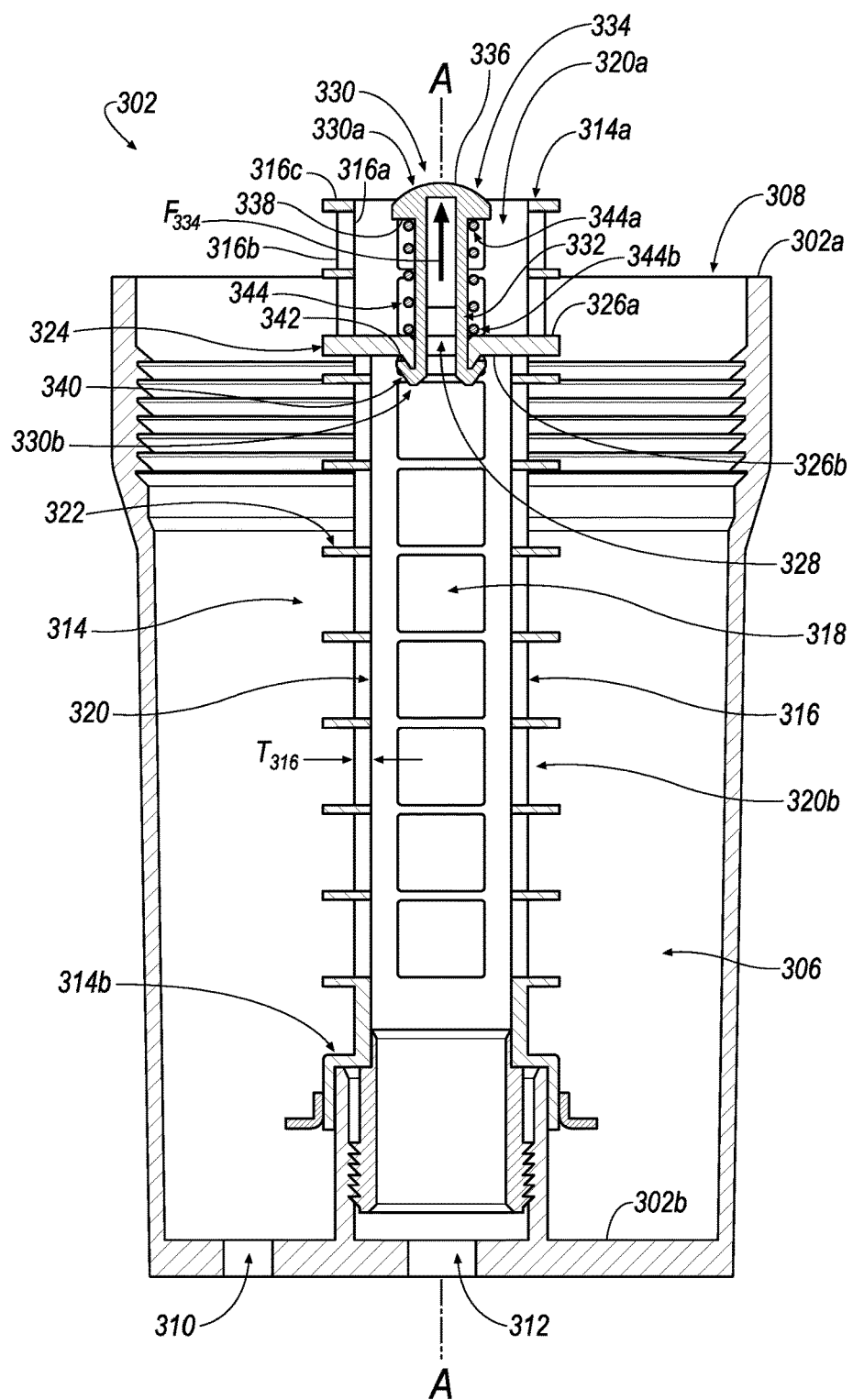
FIG. 15A is a cross-sectional view of an exemplary canister of an exemplary enclosure.
Figure 15B:
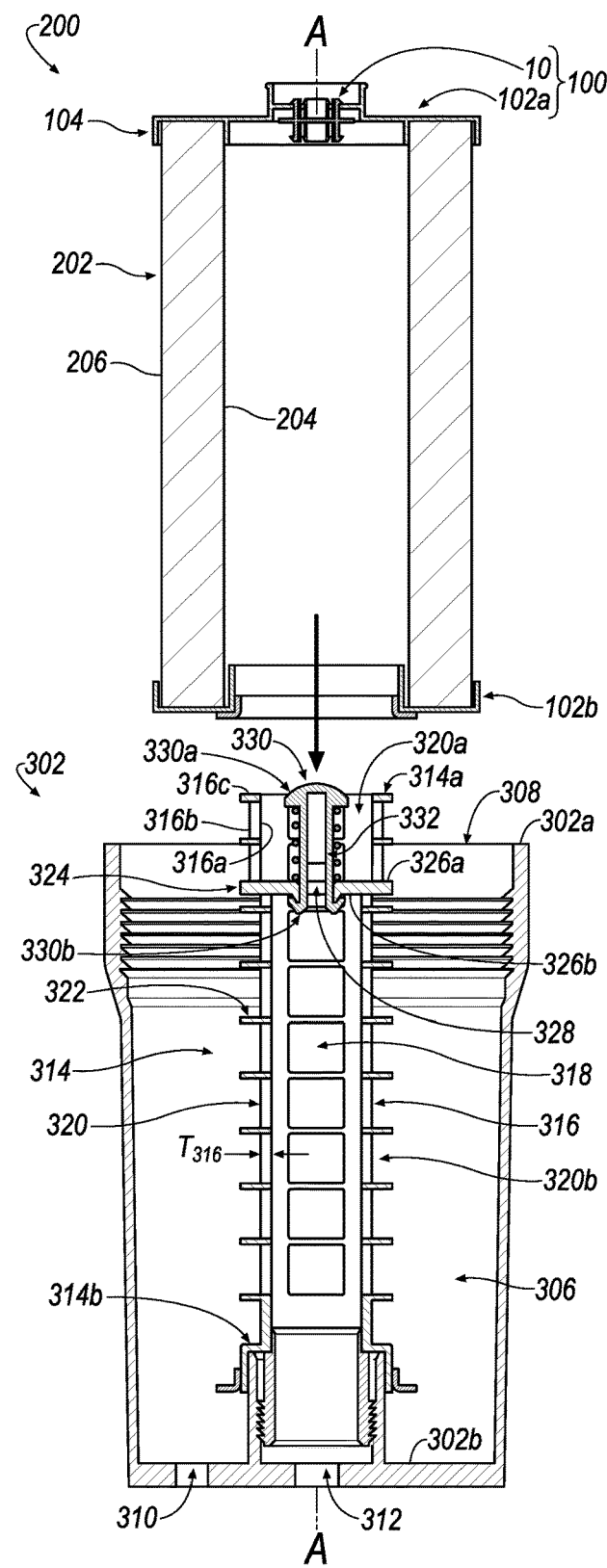
FIG. 15B is an exploded, cross-sectional view of the exemplary canister of FIG. 15A and the exemplary filter assembly of FIG. 14.
Figure 15C:
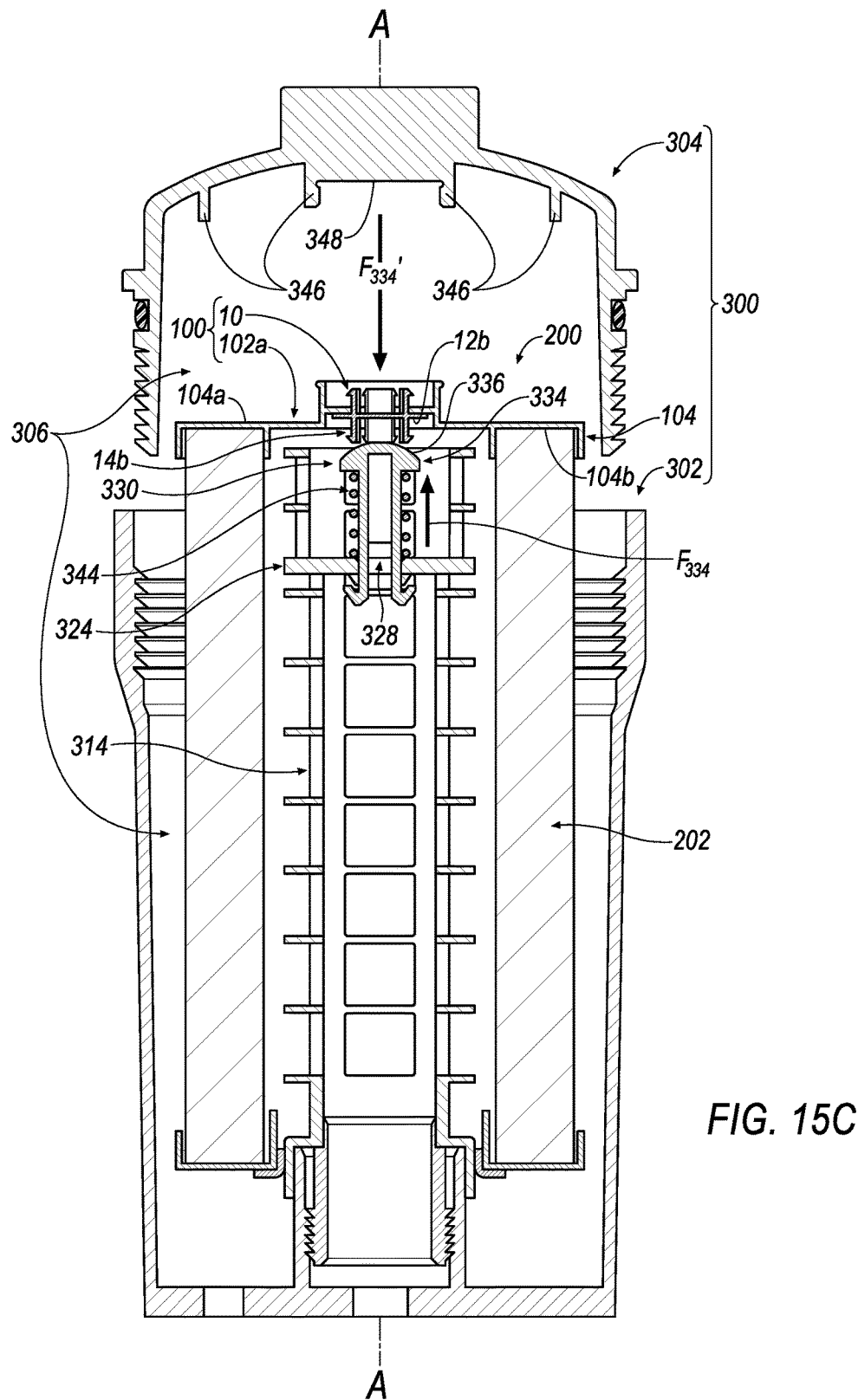
FIG. 15C is an exploded, cross-sectional view of an exemplary cover of an exemplary enclosure and the canister and the filter assembly of FIG. 15B.
Figure 15D:
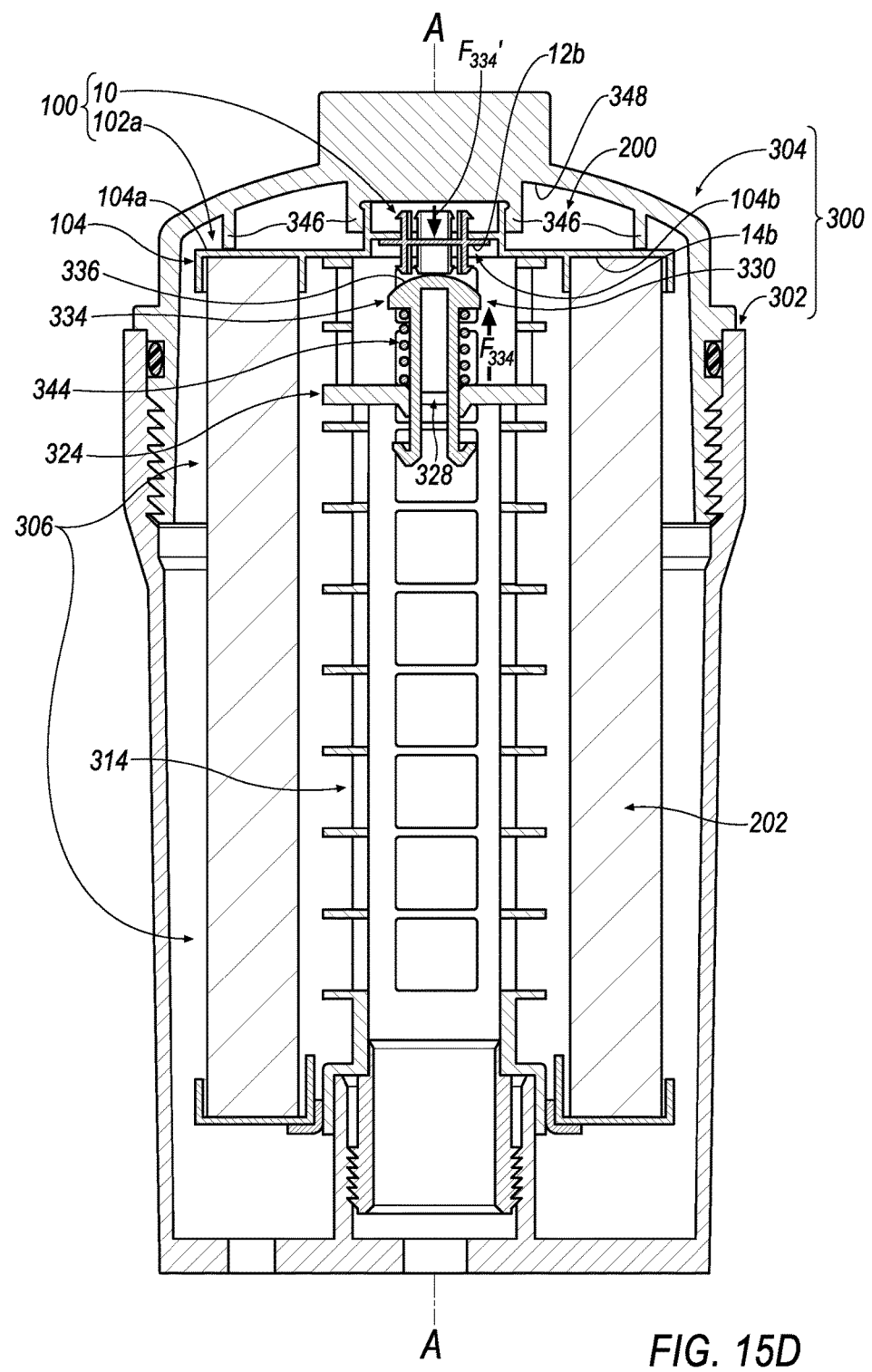
FIG. 15D is an assembled, cross-sectional view of the filter assembly and an enclosure including the cover and canister of FIG. 15C.

FIGS. 15A-15B illustrate an exemplary implementation of a canister 302. FIG. 15C illustrates the canister 302 and an exemplary implementation of a cover 304. FIGS. 15C-15D illustrate an exemplary implementation of an enclosure, which is shown generally at 300, that includes the canister 302 and the cover 304. As seen in FIGS. 15C-15D, the cover 304 is removably-secured to the canister 302 by way of, for example, a threaded connection for forming an enclosure 300. An interior surface of one or more of the canister 302 and the cover 304 may define a cavity 306. The central axis, A-A, may axially extend through an axial center of each of the canister 302 and the cover 304. Upon arranging the filter assembly 200 within the cavity 306 (as seen in FIGS. 15B-15C) and thereafter connecting the cover 304 to the canister 302 for containing the filter assembly 200 within the enclosure 300 (as seen in FIGS. 15C-15D), the central axis, A-A, may axially extend through an axial center of each of: the canister 302, the cover 304, the endcap bypass plug 10, the upper endcap 102a, the lower endcap 102b and the filter media 202.

Referring to FIG. 15A, the canister 302 may include a distal end 302a and a proximal end 302b. The distal end 302a forms a canister opening 308 that permits insertion of the filter assembly 200 into the cavity 306. The proximal end 302b of the canister 302 forms at least one fluid inlet port 310 and at least one fluid outlet port 312. The at least one fluid inlet port 310 permits entry of the fluid, F, into the enclosure 300 (as seen in, e.g., FIGS. 15E-15G), and, the at least one fluid outlet port 312 permits the fluid, F, to exit the enclosure 300 (as seen in, e.g., FIGS. 15E and 15G). The central axis, A-A, may axially extend through an axial center of the at least one fluid outlet port 312.

As seen in FIG. 15A, a standpipe 314 may be arranged within the cavity 306 of the canister 302. In an implementation, the standpipe 314 may include a distal end 314a and a proximal end 314b. The proximal end 314b of the standpipe 314 may integrally-extend from the proximal end 302b of the canister 302. In other implementations, the proximal end 314b of the standpipe 314 may be removably-connected to the proximal end 302b of the canister 302 by way of, for example, a threaded connection, an adhesive connection, a mechanical connection, a friction-fit connection or the like. The central axis, A-A, may axially extend through an axial center of the standpipe 314.

The standpipe 314 is generally defined by a tubular body 316 having an inner surface 316a, an outer surface 316b and a distal end surface 316c connecting the inner surface 316a to the outer surface 316b. The tubular body 316 extends away from proximal end 302b of the canister 302 and terminates at the distal end surface 316c to thereby define the distal end 314a of the standpipe 314; the distal end surface 316c may be arranged proximate the distal end 302a of the canister 302 such that the distal end surface 316c of the tubular body 316 may be: (1) substantially aligned with, (2) extend beyond, or (3) extend short of the distal end 302a of the canister 302 that forms the canister opening 308. In the illustrated embodiment of FIG. 15A, the distal end surface 316c of the tubular body 316 of the standpipe 314 extends slightly beyond the distal end 302a of the canister 302.

The tubular body 316 may form an axial fluid flow passage 318 that is in fluid communication with the fluid outlet port 312. Both of the fluid outlet port 312 and the axial fluid flow passage 318 may be co-axially aligned with the axis, A-A.

The tubular body 316 may further form a plurality of openings 320 that permits the fluid, F, to enter the axial fluid flow passage 318 of the standpipe 314. The plurality of openings 320 may be defined by an axial opening 320a and at least one radial opening 320b. The axial opening 320a is formed by the distal end surface 316c of the tubular body 316 and may be co-axially aligned with the axis, A-A. The at least one radial opening 320b extends through a thickness, $T_{316}$, of the tubular body 316; the thickness, $T_{316}$, of the tubular body 316 is bound by the inner surface 316a and the outer surface 316b of the tubular body 316. The at least one radial opening 320b may be arranged substantially perpendicular or orthogonal to the axis, A-A.

The outer surface 316b of the standpipe 314 may define one or more radially-outwardly-extending ribs 322 between distal end 314a and the proximal end 314b of the standpipe 314. In some implementations, the one or more radially-outwardly-extending ribs 322 may be arranged upon the outer surface 316b of the standpipe 314 in a continuous helix. Functionally, the one or more radially-outwardly-extending ribs 322 may facilitate the movement of the fluid, F, along the length of the standpipe 314, as well as to provide uniform support along an inner surface 204 of the filter media 202 if the inner surface 204 of the filter media 202 directly engages the one or more radially-outwardly-extending ribs 322.

The inner surface 316a of the standpipe 314 may define a radially-inwardly-extending rib 324. The radially-inwardly-extending rib 324 may be arranged proximate the distal end 314a of the standpipe 314. The radially-inwardly-extending rib 324 may define an upper ledge surface 326a and a lower ledge surface 326b that is arranged opposite the upper ledge surface 326a. The radially-inwardly-extending rib 324 may define a central passage 328 extending through the radially-inwardly-extending rib 324 between the upper ledge surface 326a and the lower ledge surface 326b. The central passage 328 permits the fluid, F, to flow through the radially-inwardly-extending rib 324 (as seen in, e.g., FIG. 15G); as a result, the central passage 328 may form a portion of the axial fluid flow passage 318 of the standpipe 314.

A bypass valve 330 may be arranged within the central passage 328 that is formed by the radially-inwardly-extending rib 324. The central axis, A-A, may axially extend through an axial center of the bypass valve 330. The bypass valve 330 is movably-arranged within the central passage 328 along the central axis, A-A.

The bypass valve 330 includes a distal end 330a and a proximal end 330b. The bypass valve 330 includes a body 332 that extends between the distal end 330a and the proximal end 330b. The body 332 may include a dimension (e.g., a diameter) that is substantially equal to but is slightly less than a dimension (e.g., a diameter) of the central passage 328 that is formed by the radially-inwardly-extending rib 324.

The distal end 330a of the bypass valve 330 forms a head portion 334 having an upper head surface 336 and a lower head surface 338. The head portion 334 may include a dimension (e.g., a diameter) that is slightly greater than a dimension (e.g., a diameter) of the central passage 328 that is formed by the radially-inwardly-extending rib 324.

The proximal end 330b of the bypass valve 330 forms a leg portion 340 having an upper leg surface 342. The leg portion 340 may include a dimension (e.g., a diameter) that is slightly greater than a dimension (e.g., a diameter) of the central passage 328 that is formed by the radially-inwardly-extending rib 324.

A coil spring 344 may be arranged about the body 332 of the bypass valve 330. The coil spring 344 includes a distal end 344a and a proximal end 344b. The distal end 344a of the coil spring 344 may be arranged adjacent the lower head surface 338 of the head portion 334 of the bypass valve 330. The proximal end 344b of the coil spring 344 may be arranged adjacent the upper ledge surface 326a of the radially-inwardly-extending rib 324.

Functionally, the coil spring 344 applies a biasing force (in the direction of arrow, $F_{344}$) that axially urges the head portion 334 of the bypass valve 330 away from the upper ledge surface 326a of the radially-inwardly-extending rib 324. When an axial force (in the direction of arrow, $F_{344}'$, as seen in, e.g., FIGS. 15C, 15D, 15G) greater than and opposite that of the force, $F_{344}$, imparted by the coil spring 344 is applied to the upper head surface 336 of the head portion 334, the head portion 334 of the bypass valve 330 may be urged toward the upper ledge surface 326a of the radially-inwardly-extending rib 324, thereby compressing the coil spring 344 between the lower head surface 338 of the head portion 334 and the upper ledge surface 326a of the radially-inwardly-extending rib 324. When the axial force, $F_{344}'$, is no longer applied to the upper head surface 336 of the head portion 334, the coil spring 344 is permitted to expand, and, as a result, the biasing force, $F_{344}$, imparted by the coil spring 344 urges the head portion 334 of the bypass valve 330 away from the upper ledge surface 326a of the radially-inwardly-extending rib 324.

As seen in FIG. 15A, prior to inserting the filter assembly 200 into the cavity 306, the coil spring 344 is arranged in a substantially fully expanded state. The substantially fully expanded state of the coil spring 344 results in the upper leg surface 342 of the leg portion 340 of the bypass valve 330 being arranged adjacent the lower ledge surface 326b of the radially-inwardly-extending rib 324 to thereby prevent the bypass valve 330 from being urged through the central passage 328 formed by the radially-inwardly-extending rib 324 and being disconnected from the standpipe 314.

Referring to FIGS. 15B-15C, when the filter assembly 200 is inserted into the cavity 306, the filter media 202 circumscribes the standpipe 314 (as seen in FIG. 15C), and, each leg member $14b_1$-$14b_4$ of the at least one lower leg member 14b extending from the lower surface 12b of the annular body 12 of the endcap bypass plug 10 may be disposed adjacent the upper head surface 336 of the head portion 334 of the bypass valve 330 (as seen in FIG. 15C). As a result of the weight of the filter assembly 200 being supported by the bypass valve 330 as a result of the contact of each leg member $14b_1$-$14b_4$ of the endcap bypass plug 10 with the upper head surface 336 of the head portion 334 of the bypass valve 330, the filter assembly 200 may impart an axial force, $F_{344}'$, to the bypass valve 330, which may result in the bypass valve 330 being slightly urged through the central passage 328 formed by the radially-inwardly-extending rib 324 and thereby slightly compressing the coil spring 344.

Although an implementation of each leg member $14b_1$-$14b_4$ of the at least one lower leg member 14b of the endcap bypass plug 10 may be disposed adjacent the upper head surface 336 of the head portion 334 of the bypass valve 330 as described above, the invention is not limited to such an embodiment. For example, in an implementation of the endcap bypass plug 10 omitting the at least one lower leg member 14b from the design of the endcap bypass plug 10, the upper head surface 336 of the head portion 334 of the bypass valve 330 may be disposed directly adjacent the lower surface 12b of the annular body 12 of the endcap bypass plug 10.

Referring to FIGS. 15C-15D, when the cover 304 is connected to the canister 302 for containing the filter assembly 200 within the enclosure 300, axially-extending projections 346 that extend from an inner surface 348 of the cover 304 may engage and further exert the axial force, $F_{344}'$, upon the upper surface 104a of the endcap 102a (as seen in FIG. 15D). The further-exerted axial force, $F_{344}'$, to the bypass valve 330, may further result in the bypass valve 330 being further slightly urged through the central passage 328 formed by the radially-inwardly-extending rib 324 and thereby further slightly compressing the coil spring 344. After connecting the cover 304 to the canister, the biasing force, $F_{344}$, arising from the coil spring 344 urges the upper head surface 336 of the head portion 334 of the bypass valve 330 toward each leg member $14b_1$-$14b_4$ of the at least one lower leg member 14b of the endcap bypass plug 10, which results in the endcap assembly 100 being maintained in the sealed orientation as described above (i.e., the biasing force, $F_{344}$, arising from the coil spring 344 is indirectly applied to the endcap bypass plug 10 by way of the bypass valve 330 for arranging the endcap bypass plug 10 in a sealed orientation with respect to the upper endcap 102a without the bypass valve 330 ever directly engaging any surface portion such as, for example, the lower surface 104b of the upper endcap 102a).

Figure 15E:
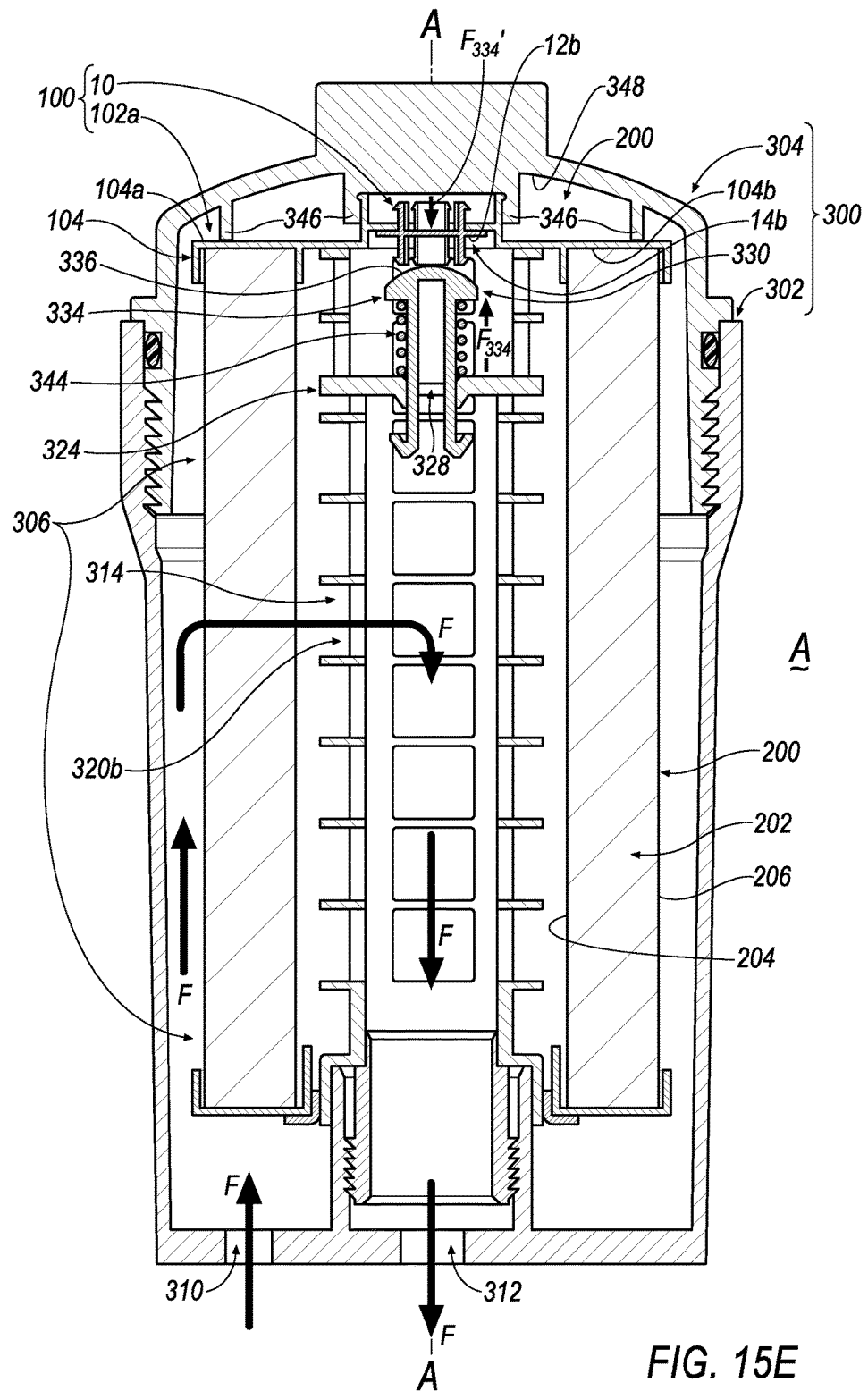
FIGS. 15E-15G are cross-sectional views of the enclosure and filter assembly of FIG. 15D including exemplary fluid flow paths.
Figure 15F:
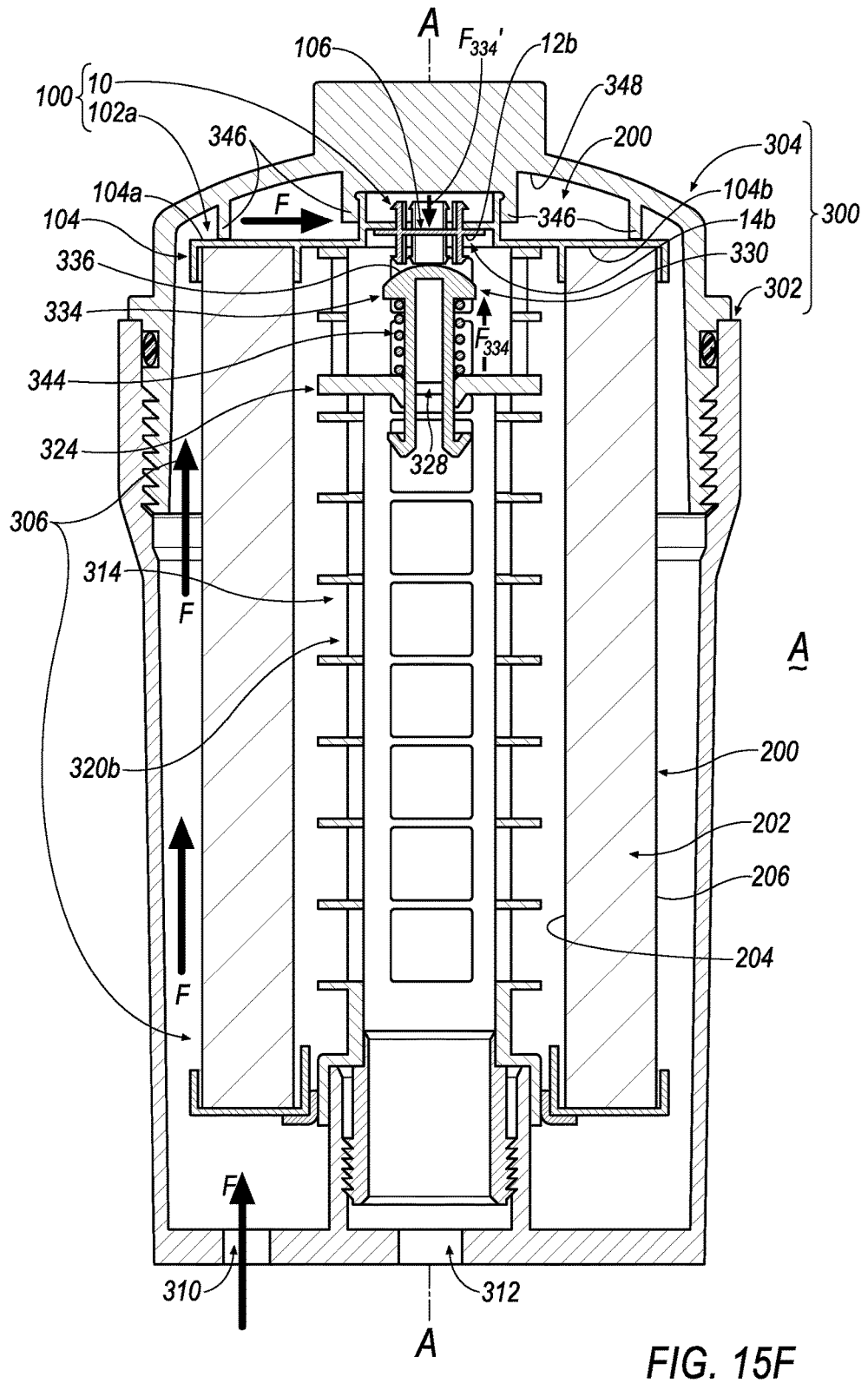
Figure 15G:
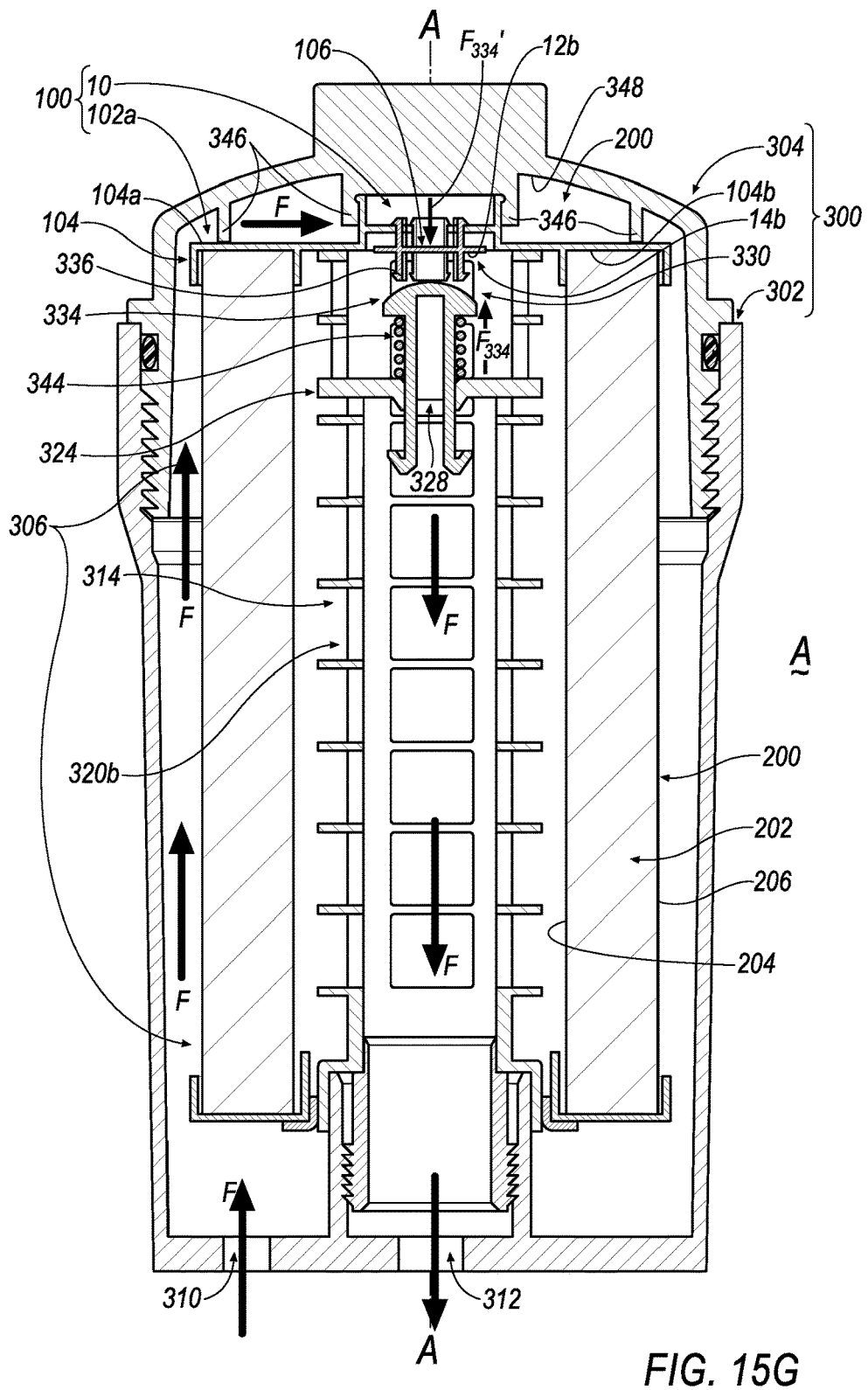

Referring to FIGS. 15E-15G, an implementation of a method for utilizing the filter assembly 200 including the endcap assembly 100 is described. Upon connecting the cover 304 to the canister 302, the cavity 306 containing the filter assembly 200 is sealed from atmospheric surroundings, A. Then, as seen in FIG. 15E, the fluid, F, is permitted to enter the cavity 306 by way of the inlet port 310. The fluid, F, may then radially enter the filter media 202 at an exterior surface 206 of the filter media 202 and subsequently exit the filter media 202 at the inner surface 204 of the filter media 202. The fluid, F, that is disposed about the exterior surface 206 of the filter media 202 may be referred to as "unfiltered fluid," and, the fluid, F, that radially enters the filter media 202 (at the exterior surface 206 of the filter media 202) and then subsequently exits the filter media 202 (at the inner surface 204 of the filter media 202) may be referred to as "filtered fluid." The filtered fluid, F, may then enter the at least one radial opening 320b of the standpipe 314 and exit the cavity 306 at the outlet port 312 for receipt by downstream components of a fluid system. In an example, the enclosure 300 containing the filter assembly 200 may be connected to a fluid system (not shown). In some implementations, the fluid system may include an internal combustion engine (not shown) for receiving the unfiltered fluid, F, via the inlet port 310 and returning filtered to the internal combustion engine via the outlet port 312.

After a period passing the unfiltered fluid, F, through the filter media 202 from the exterior surface 206 to the interior surface 204 as described above at FIG. 15E, the filter media 202 may become saturated with impurities that were previously contained by the unfiltered fluid. As a result, the filter media 202 may eventually become clogged with the impurities.

Referring to FIG. 15F, when the filter media 202 becomes clogged with the impurities, the unfiltered fluid, F, is prevented from passing through the filter media 202 from the exterior surface 206 to the interior surface 204. As a result, the unfiltered fluid, F, fills the cavity 306 at least about: (1) the exterior surface 206 of the filter media 202, (2) the upper surface 104a of the annular body 104 of the upper endcap 102a and (3) the entire axial passage 106 of the upper endcap 102a that is fluidly sealed and closed-out by the endcap bypass plug 10 that is biased to the sealed orientation with respect to the upper endcap 102a by application of the biasing force, $F_{344}$, imparted by the coil spring 344.

As a result of the filter media 202 being clogged with impurities and the unfiltered fluid, F, being further deposited into the cavity 306 by way of the inlet port 310, the unfiltered fluid, F, eventually results in a pressure buildup of an unfiltered fluid force, $F_{344}'$, within the axial passage 106 of the upper endcap 102a. The unfiltered fluid force, $F_{344}'$, is opposite to the biasing force, $F_{344}$, imparted by the coil spring 344.

Referring to FIG. 15G, when the unfiltered fluid force, $F_{344}'$, becomes greater than the biasing force, $F_{344}$, imparted by the coil spring 344, the unfiltered fluid, F, within the axial passage 106 of the upper endcap 102a urges the upper surface 12a of the annular body 12 of the endcap bypass plug 10 away from lower surface 104b of the annular body 104 of the endcap 102a such that the endcap assembly 100 transitions from the sealed orientation (as seen and described above in FIGS. 9C, 10, 10') to the unsealed orientation (as seen and described above in FIGS. 9D, 11, 11'); thus, as a result, the upper surface 12a of the annular body 12 of the endcap bypass plug 10 is arranged in an opposing, spaced-apart relationship with respect to the lower surface 104b of the annular body 104 of the endcap 102a. As shown and described above at FIG. 11', when arranged in the unsealed orientation, the axial passage 106 of the upper endcap 102a and the at least one radial passage 38 of the endcap bypass plug 10 cooperate to form the at least one fluid-flow bypass passages 110; the at least one fluid-flow bypass passage 110 permits the unfiltered fluid, F, to flow there-though to thereby relieve the pressure of the unfiltered fluid, F, (and the unfiltered fluid force, $F_{344}'$) that built up within the axial passage 106 of the upper endcap 102a. Thus, as a result of the endcap assembly 100 being arranged in the unsealed orientation, the unfiltered fluid, F, is permitted to flow: (1) from about the upper surface 104a of the annular body 104 of the endcap 102a, (2) into the upper opening 108a formed by the upper surface 104a of the endcap 102a, (3) axially through the axial passage 106 along the axial fluid-flow path, $F_A$, (4) out of the lower opening 108b formed by the lower surface 104b of the endcap 102a, (5) radially through the at least one radial passage 38 along the radial fluid-flow path, $F_R$, and (6) about the lower surface 104b of the annular body 104 of the endcap 102a.

As described above, the biasing force, $F_{344}$, arising from the coil spring 344 is indirectly applied to the endcap bypass plug 10 by way of the bypass valve 330 for arranging the endcap bypass plug 10 in a sealed orientation with respect to the upper endcap 102a. As a result, the upper head surface 336 of the head portion 334 of the bypass valve 330 never directly engages any portion of the upper endcap 102a (such as, e.g., the lower surface 104b, the lower opening 108b or the like), which, in the absence of the endcap bypass plug 10, would otherwise result in the upper head surface 336 of the head portion 334 of the bypass valve 330 directly engaging a portion of the upper endcap 102a (such as, e.g., the lower surface 104b, the lower opening 108b or the like).

Although an endcap bypass plug 10 is described above in connection with an endcap assembly 100 and a filter assembly 200, embodiments of the endcap assembly 100 and filter assembly 200 are not limited to the endcap bypass plug 10, and, as such, it is contemplated that other endcap bypass plugs (as seen in, e.g., FIGS. 16-20 and FIGS. 22-26) may be utilized for forming alternative endcap assemblies (as seen in, e.g., FIGS. 21A-21B and 27A-2B) that may be utilized for forming alternative filter assemblies. Implementations of alternative endcap bypass plugs are shown generally at 10' (see, e.g., FIGS. 16-20) and 10" (see, e.g., FIGS. 22-26), respectively.

Figure 17:
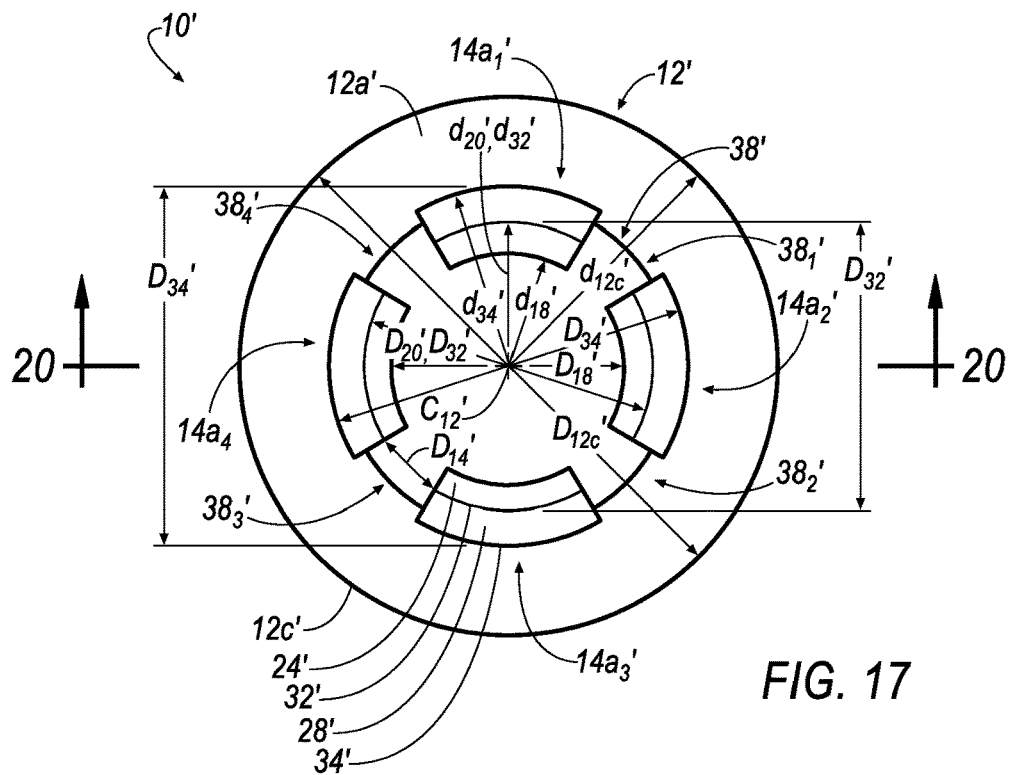
FIG. 17 is a top view of the endcap bypass plug of FIG. 16.
Figure 18:
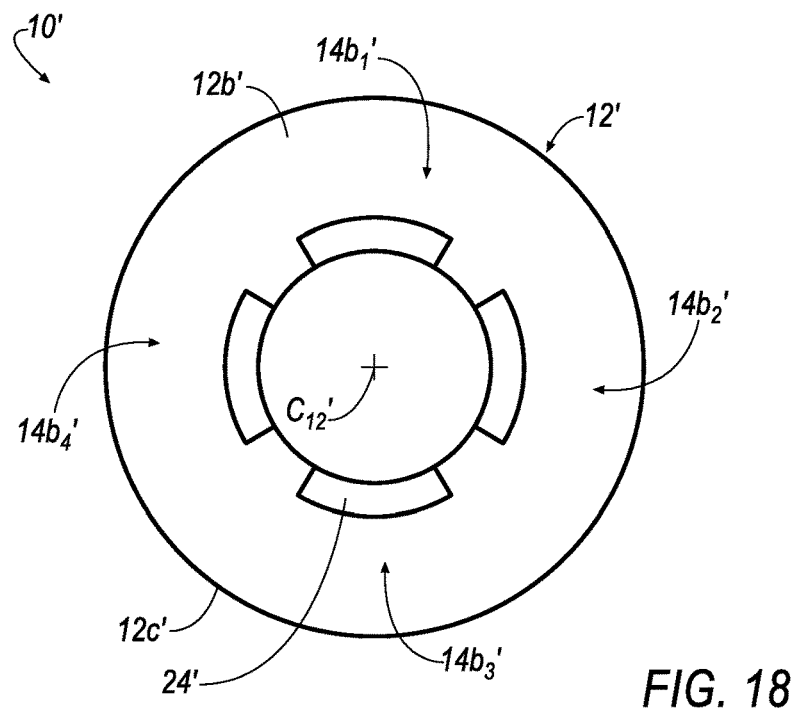
FIG. 18 is a bottom view of the endcap bypass plug of FIG. 16.

In an implementation, the endcap bypass plug 10' includes an annular body 12' having an upper surface 12a', a lower surface 12b' and an outer side surface 12c' joining the upper surface 12a' to the lower surface 12b'. The outer side surface 12c' of the annular body 12' may define a dimension (e.g., a diameter, $D_{12c}'$, as seen in FIG. 17) of the endcap bypass plug 10'. A central axis, A-A, may axially extend through an axial center, $C_{12}'$ (as seen in FIG. 17), of the annular body 12' of the bypass plug 10'.

Leg members 14' may be integral with and extend away from one or more of the upper surface 12a' and the lower surface 12b' of the annular body 12'. The leg members 14' may include at least one upper leg member 14a' and at least one lower leg member 14b'. The at least one upper leg member 14a' may extend from the upper surface 12a' of the annular body 12'. The at least one lower leg member 14b' may extend from the lower surface 12b' of the annular body 12'. In an implementation the at least one leg member 14a', 14b' may be defined to respectively include four upper leg members $14a_1'$-$14a_4'$ and four lower leg members $14b_1'$-$14b_4'$. Although the endcap bypass plug 10' is described to include leg members 14' having at least one upper leg member 14a' and at least one lower leg member 14b', in some implementations, the at least one lower leg member 14b' may be omitted from the design of the endcap bypass plug 10'.

In an implementation, each leg member $14a_1'$-$14a_4'$ of the at least one upper leg member 14a' may include a flexible stem portion 16' that extends away from the upper surface 12a' of the annular body 12'. Each flexible stem portion 16' may include an inwardly-facing surface 18' and an outwardly-facing surface 20'. The inwardly-facing surface 18' and the outwardly-facing surface 20' define each flexible stem portion 16' to include an arcuate shape. In an implementation, each leg member $14b_1'$-$14b_4'$ of the at least one lower leg member 14b' include a substantially similar dimension to the flexible stem portion 16' as described above.

Figure 19:
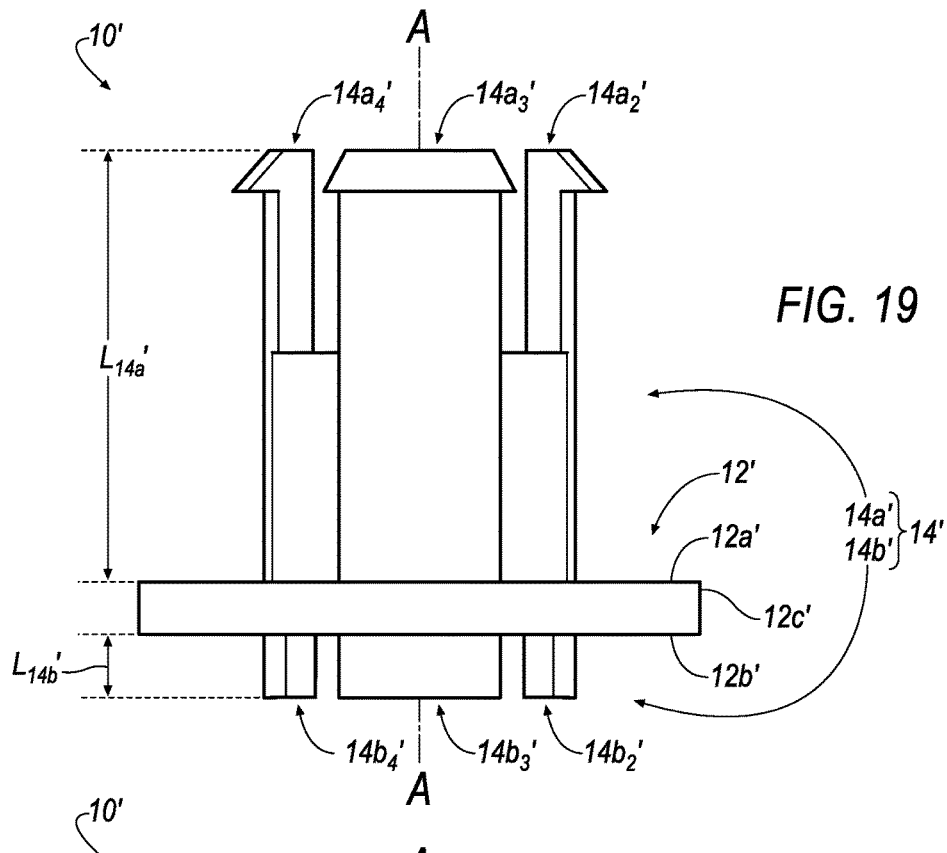
FIG. 19 is a side view of the endcap bypass plug of FIG. 16.

Although each leg member $14b_1'$-$14b_4'$ of the at least one lower leg member 14b' include a substantially similar dimension to the flexible stem portion 16' of each leg member $14a_1'$-$14a_4'$ of the at least one upper leg member 14a', each leg member $14b_1'$-$14b_4'$ of the at least one lower leg member 14b' does not share a similar length dimension as that of each leg member $14a_1'$-$14a_4'$ of the at least one upper leg member 14a'. For example, as seen in FIG. 19, each leg member $14a_1'$-$14a_4'$ of the at least one upper leg member 14a' may extend away from the upper surface 12a' at a length, $L_{14a}'$, whereas each leg member $14b_1'$-$14b_4'$ of the at least one lower leg member 14b' may extend away from the lower surface 12b' at a length, $L_{14b}'$. The length, $L_{14b}'$, of each leg member $14b_1'$-$14b_4'$ of the at least one lower leg member 14b' may be approximately equal to about one-eighth the length, $L_{14a}'$, of each leg member $14a_1'$-$14a_4'$ of the at least one upper leg member 14a'. The differences in length, $L_{14a}'$, $L_{14b}'$, may be advantageous in situations when a cover 304 of an enclosure 300 does not include axially-extending projections 346, or, for example, when there is a greater spacing between the upper surface 104a of the endcap 102a and the inner surface 348 of the cover 304. In other implementations, as seen above regarding the endcap bypass plug 10, the at least one upper and lower leg members 14a, 14b are designed symmetrically, including the same length and geometry; as a result, when the endcap bypass plug 10 is joined to the endcap 102a, a person or robotic device does not have to be concerned with identifying which side of the endcap bypass plug 10 constitutes the at least one upper leg member 14a that is to be inserted through the axial passage 106 of the endcap 102a.

In some implementations, the inwardly-facing surface 18' of each flexible stem portion 16' may be equally spaced from the central axis, A-A, extending through the axial center of the annular body 12' at a radius/radial distance, $d_{18}'$ (as seen in FIG. 17). As a result, if the inwardly-facing surface 18' of each leg member $14a_1'$-$14a_4'$ is equally spaced from the central axis, A-A, at the radial distance, $d_{18}'$, and are arranged in a circular orientation, collectively, the inwardly-facing surface 18' of each leg member $14a_1'$-$14a_4'$ of the at least one upper leg member 14a' may define a dimension (e.g., a diameter, $D_{18}'$, as seen in FIG. 17) of the endcap bypass plug 10'. In an implementation, each leg member $14b_1'$-$14b_4'$ of the at least one lower leg member 14b' include a substantially similar dimension to the inwardly-facing surface 18' as described above.

The outwardly-facing surface 20' of each flexible stem portion 16' may be equally spaced from the central axis, A-A, extending through the axial center of the annular body 12' at a radius/radial distance, $d_{20}'$ (as seen in FIG. 17). As a result, if the outwardly-facing surface 20' of each leg member $14a_1'$-$14a_4'$ is equally spaced from the central axis, A-A, at the radial distance, $d_{20}'$, and are arranged in a circular orientation, collectively, the outwardly-facing surface 20' of each leg member $14a_1'$-$14a_4'$ of the at least one upper leg member 14a' may define a dimension (e.g., a diameter, $D_{20}'$, as seen in FIG. 17) of the endcap bypass plug 10'. In an implementation, each leg member $14b_1'$-$14b_4'$ of the at least one lower leg member 14b' include a substantially similar dimension to the outwardly-facing surface 20' as described above.

Figure 16:
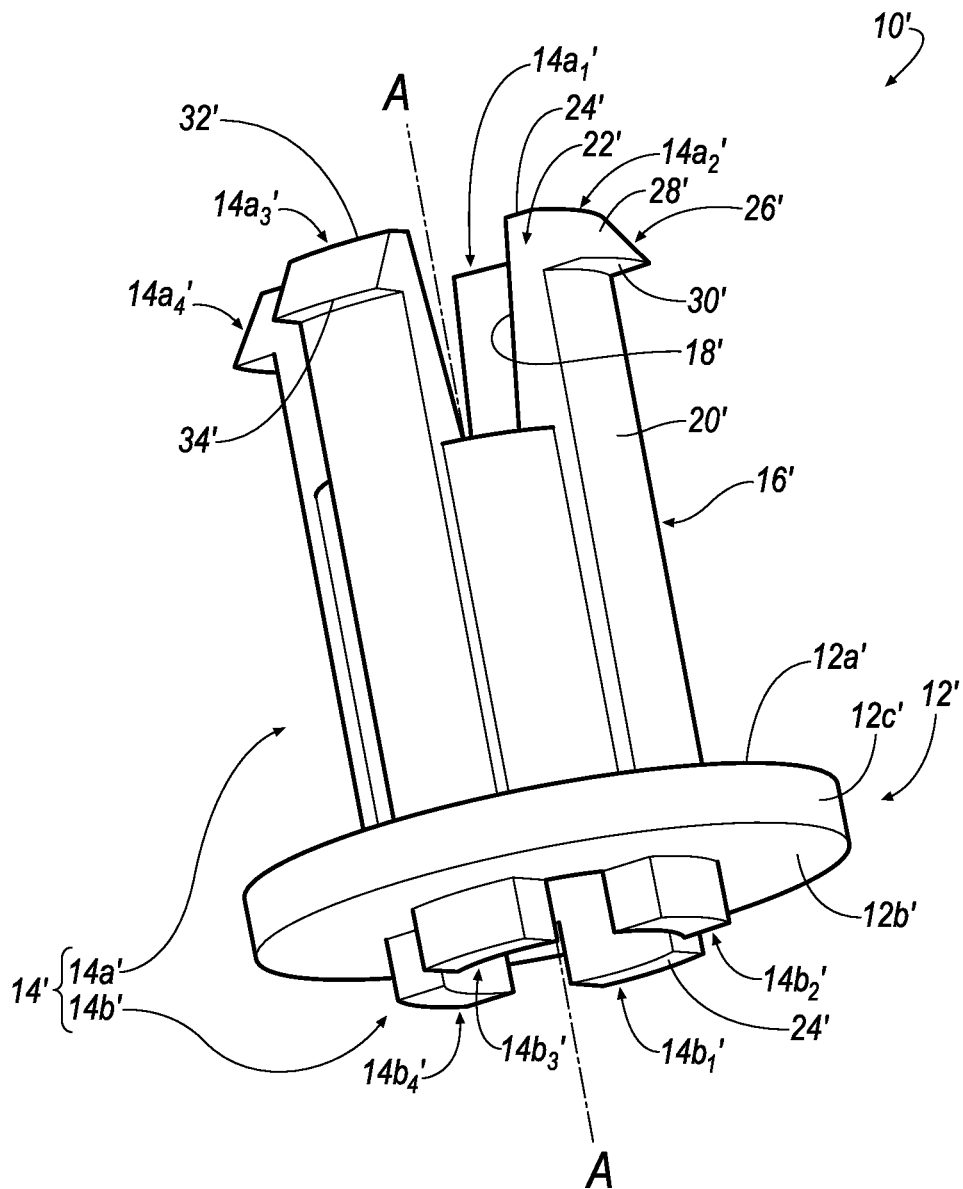
FIG. 16 is a perspective view of an exemplary endcap bypass plug.

Referring to FIG. 16, each flexible stem portion 16' of each leg member $14a_1'$-$14a_4'$ of the at least one upper leg member 14a' terminates with a head portion 22'. The head portion 22' includes an upper surface 24'. The upper surface 24' defines each head portion 22' to include an arcuate shape (as seen in FIG. 17). In an implementation, each leg member $14b_1'$-$14b_4'$ of the at least one lower leg member 14b' does not include a head portion 22 as described above regarding each leg member $14a_1'$-$14a_4'$ of the at least one upper leg member 14a'. Rather, each leg member $14b_1'$-$14b_4'$ of the at least one lower leg member 14b' includes a distal end surface, which may share the same reference numeral 24' as upper surface 24' of each leg member $14a_1'$-$14a_4'$ of the at least one upper leg member 14a'.

Referring to FIG. 16, the head portion 22' of each leg member $14a_1'$-$14a_4'$ of the at least one upper leg member 14a' may further include a nose portion 26' that extends radially outwardly from each head portion 22'. In an implementation, the nose portion 26' may be defined by a ramp surface 28' and a lower surface 30'. The ramp surface 28' and the lower surface 30' defines each nose portion 26' to include an arcuate shape (as seen in FIG. 17). In an implementation, each leg member $14b_1'$-$14b_4'$ of the at least one lower leg member 14b' does not include a nose portion as described above.

As seen in FIGS. 16-17, the ramp surface 28' of the nose portion 26' is connected to the upper surface 24' of the head portion 22' to define an upper edge 32'. The upper edge 32' may be arcuately-shaped. The upper edge 32' of each nose portion 26' of each leg member $14a_1'$-$14a_4'$ of the at least one upper leg member 14a' may be equally spaced from the central axis, A-A, extending through the axial center of the annular body 12' at a radius/radial distance, $d_{32}'$ (as seen in FIG. 17); as a result, if the upper edge 32' of each leg member $14a_1'$-$14a_4'$ is equally spaced from the central axis, A-A, at the radial distance, $d_{32}'$, and are arranged in a circular orientation, collectively, the upper edges 32' each leg member $14a_1'$-$14a_4'$ of the at least one upper leg member 14a' may define a dimension (e.g., a diameter, $D_{32}'$, as seen in FIG. 17) of the endcap bypass plug 10'. In some implementations, the diameter, $D_{20}'$, defined by the outwardly-facing surface 20' of each leg member $14a_1'$-$14a_4'$ of the at least one upper leg member 14a' may be approximately equal to the diameter, $D_{32}'$, defined by the upper edges 32' each leg member $14a_1'$-$14a_4'$ of the at least one upper leg member 14a'.

Figure 20:
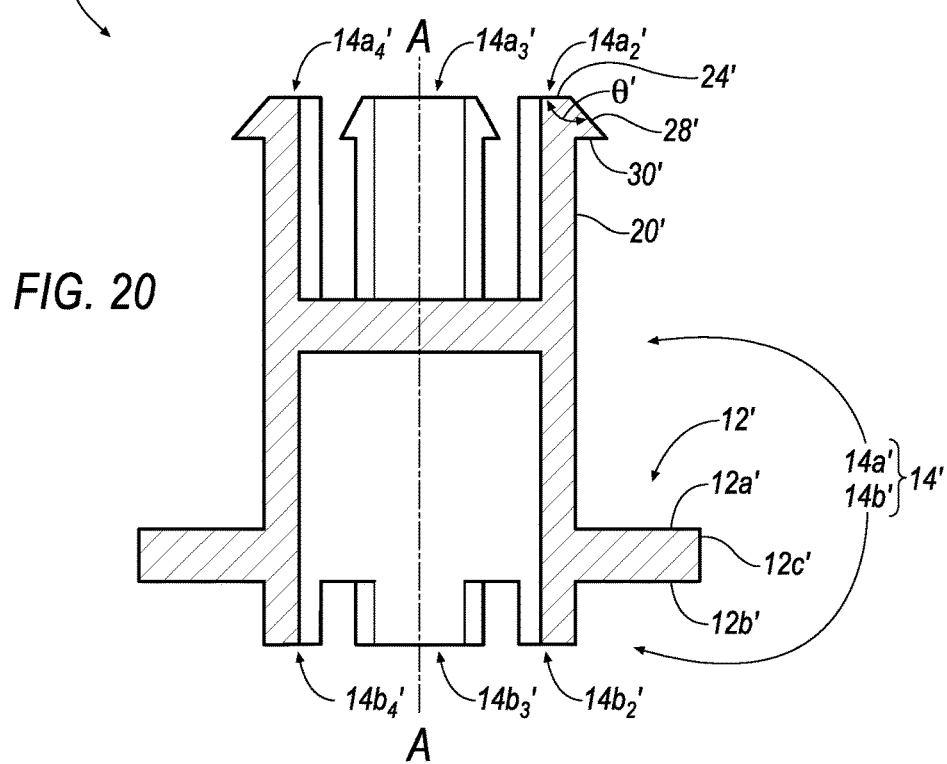
FIG. 20 is a cross-sectional view of the endcap bypass plug according to line 20-20 of FIG. 17.

Referring to FIG. 20, in some implementations, the ramp surface 28' of the nose portion 26' is connected to the upper surface 24' of the head portion 22' at an angle, θ'. In an example, the angle, θ', may be equal to approximately about 120°.

Referring to FIG. 16, the lower surface 30' of the nose portion 26' is connected to both of the outwardly-facing surface 20' of the flexible stem portion 16' and the ramp surface 28' of the nose portion 26'. In some instances, as seen in FIG. 20, the lower surface 30' of the nose portion 26' is connected to the outwardly-facing surface 20' of the flexible stem portion 16' in a substantially perpendicular orientation.

The ramp surface 28' of the nose portion 26' is connected to the lower surface 30' of the nose portion 26' to define a lower edge 34'. As seen in FIG. 17, the lower edge 34' may be arcuately-shaped. The lower edge 34' of each nose portion 26' of each leg member $14a_1'$-$14a_4'$ of the at least one upper leg member 14a' may be equally spaced from the central axis, A-A, extending through the axial center of the annular body 12' at a radius/radial distance, $d_{34}'$ (as seen in FIG. 17); as a result, if the lower edge 34' of each leg member $14a_1'$-$14a_4'$ is equally spaced from the central axis, A-A, at the radial distance, $d_{34}'$, and are arranged in a circular orientation, collectively, the lower edges 34' each leg member $14a_1'$-$14a_4'$ of the at least one upper leg member 14a' may define a dimension (e.g., a diameter, $D_{34}'$, as seen in FIG. 17) of the endcap bypass plug 10'.

Referring to FIG. 17, in some implementations, the four leg members $14a_1'$-$14a_4'$ of the at least one upper leg member 14a' may each be equally spaced apart by an arcuate distance, $D_{14}'$. The arcuate distance, $D_{14}'$, results in neighboring leg members of the four leg members $14a_1'$-$14a_4'$ forming at least one radial passage 38' (i.e., four radial passages $38_1'$-$38_4'$) defining radial fluid-flow paths (that are similar to the radial fluid-flow paths, $F_R$, of the endcap bypass plug 10) there between, which are referenced from the central axis, A-A, extending through the axial center of the endcap bypass plug 10'. In an implementation, each leg member $14b_1'$-$14b_4'$ of the at least one lower leg member 14b' include a substantially similar dimension to the arcuate distance, $D_{14}$, as described above.

Figure 21A:
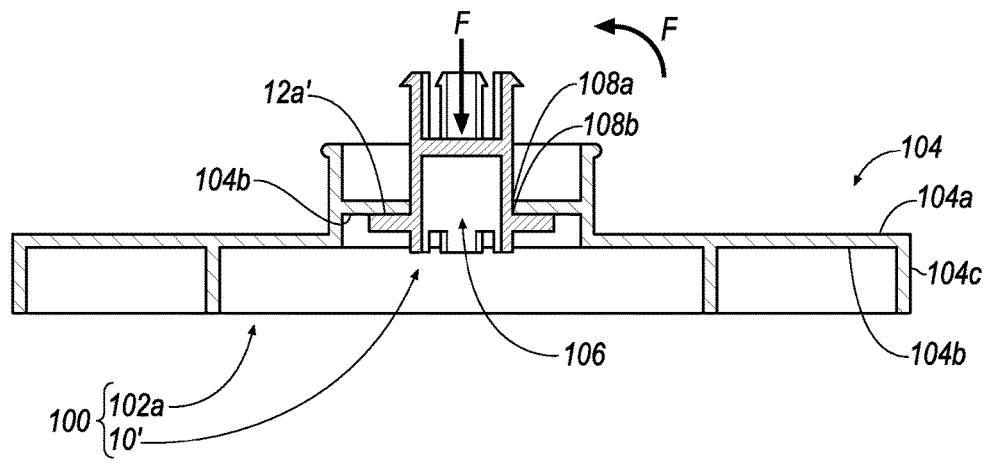
FIG. 21A is a cross-sectional view of an exemplary endcap assembly including the endcap bypass plug of FIG. 16 arranged in an assembled, sealed orientation.
Figure 21B:
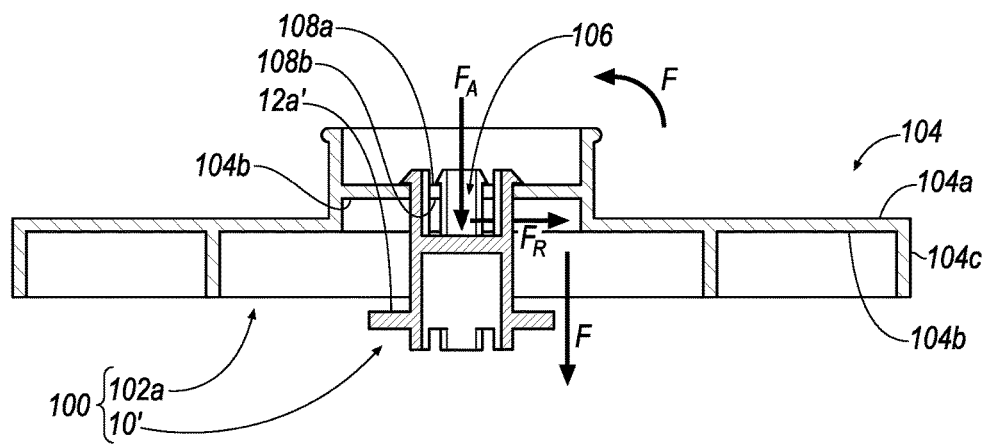
FIG. 21B is another cross-sectional view of the endcap assembly according to FIG. 21A arranged in an assembled, unsealed orientation.

Referring to FIGS. 21A-21B, an embodiment of an endcap assembly 100 includes the endcap bypass plug 10' arranged within the axial passage 106 of the endcap 102a such that the endcap bypass plug 10' is movably-connected connected to the endcap 102a. The endcap bypass plug 10' may deflect (in a substantially similar manner as seen above at FIGS. 9B'-9B"") or materially deform when being inserted through the axial passage 106 of the endcap 102a for joining the endcap bypass plug 10' to the endcap 102a. The endcap bypass plug 10' is movably-arranged along the central axis, A-A, that axially extends through the axial center of each of the bypass plug 10' and the endcap 102a. The endcap 102a includes the same design as shown and described above at FIGS. 6-8.

The endcap bypass plug 10' is permitted to be movably-arranged within the axial passage 106 of the endcap 102a in order to configure the endcap assembly 100 to be arranged in one of at least two orientations. The first orientation may be a fluidly unsealed orientation (see, e.g., FIG. 21B), and, the second orientation may be a fluidly sealed orientation (see, e.g., FIG. 21A).

As seen, for example, in FIG. 21B, the unsealed orientation of the endcap assembly 100 is defined by/realized when the upper surface 12a' of the annular body 12' of the endcap bypass plug 10' is arranged in an opposing, spaced-apart relationship with respect to the lower surface 104b of the annular body 104 of the endcap 102a; when arranged in such an orientation, a fluid, F, is permitted to flow: (1) from about the upper surface 104a of the annular body 104 of the endcap 102a, (2) into the upper opening 108a formed by the upper surface 104a of the endcap 102a, (3) axially through the axial passage 106 along the axial fluid-flow path, $F_A$, (4) out of the lower opening 108b formed by the lower surface 104b of the endcap 102a, (5) radially through the at least one radial passage 38' and beyond the outwardly-facing surface 20' of the stem portion 16' along the radial fluid-flow path, $F_R$, and (6) about the lower surface 104b of the annular body 104 of the endcap 102a. As a result of the cooperation of the axial passage 106 of the endcap 102a and the at least one radial passage 38' of the endcap bypass plug 10', collectively, the axial passage 106 and the at least one radial passage 38' may define the endcap assembly 100 to include at least one fluid-flow bypass passages (that are similar to the at least one fluid-flow bypass passages 110 of the endcap assembly 100).

As seen, for example, in FIG. 21A, the sealed orientation of the endcap assembly 100 is defined by/realized when the upper surface 12a' of the annular body 12' of the endcap bypass plug 10' is arranged in an adjacent relationship with the lower surface 104b of the annular body 104 of the endcap 102a while also closing-out and fluidly-sealing both of the upper opening 108a and the lower opening 108b formed, respectively, by the upper surface 104a and the lower surface 104b of the endcap 102a; when arranged in such an orientation, the fluid, F, remains about: (1) the upper surface 104a of the annular body 104 of the endcap 102a, and, as a result, is not permitted to flow: (2) into the upper opening 108a formed by the upper surface 104a of the endcap 102a, and (3) axially into the axial passage 106 along the axial fluid-flow path, $F_A$, (4) out of the lower opening 108b formed by the lower surface 104b of the endcap 102a and (5) radially through the at least one radial passage 38 along the radial fluid-flow path, $F_R$, and beyond the outwardly-facing surface 20 of the stem portion 16. Therefore, the fluid, F, is not permitted to be arranged (6) about the lower surface 104b of the annular body 104 of the endcap 102a, and, as a result, the fluid, F, remains: (6a) about the upper surface 104a of the annular body 104 of the endcap 102a.

In some implementations, the upper surface 12a' of the annular body 12' of the endcap bypass plug 10' may include a sealing member that is substantially similar to the sealing member 36 as shown and described above at FIGS. 4'-5'. Although not illustrated, the endcap assembly 100 (including the endcap 102a and the endcap bypass plug 10' described above at FIGS. 21A-21B) may be joined to filter media (see, e.g., the filter media 202 of FIGS. 12-14) form forming a filter assembly. The filter assembly may also include a lower endcap (see, e.g., the lower endcap 102b of FIGS. 12-14). The filter assembly may be arranged within an enclosure (see, e.g., the enclosure 300 of FIGS. 15A-15G) and function in a substantially similar manner as described above at FIGS. 15E-15G.

Figure 22:
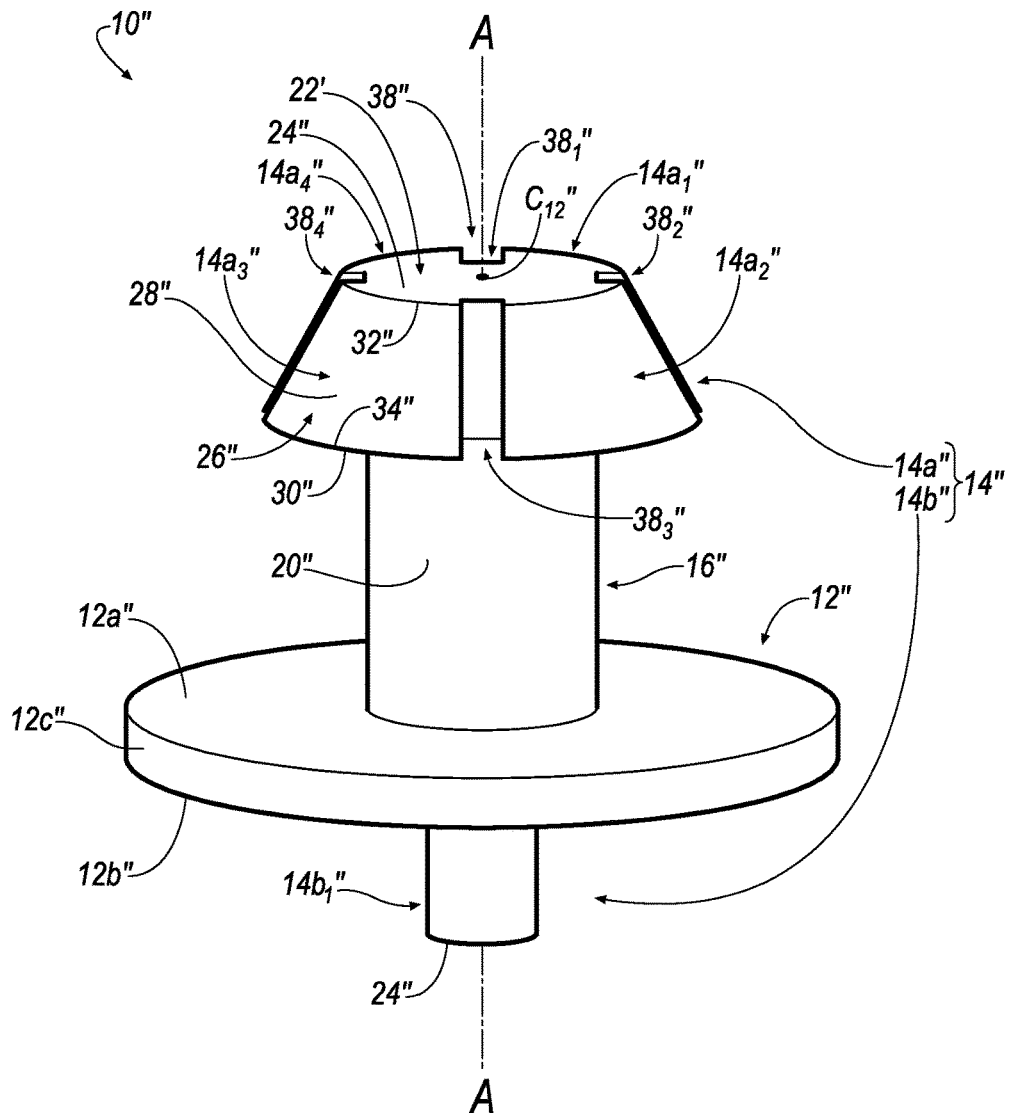
FIG. 22 is a perspective view of an exemplary endcap bypass plug.
Figure 23:
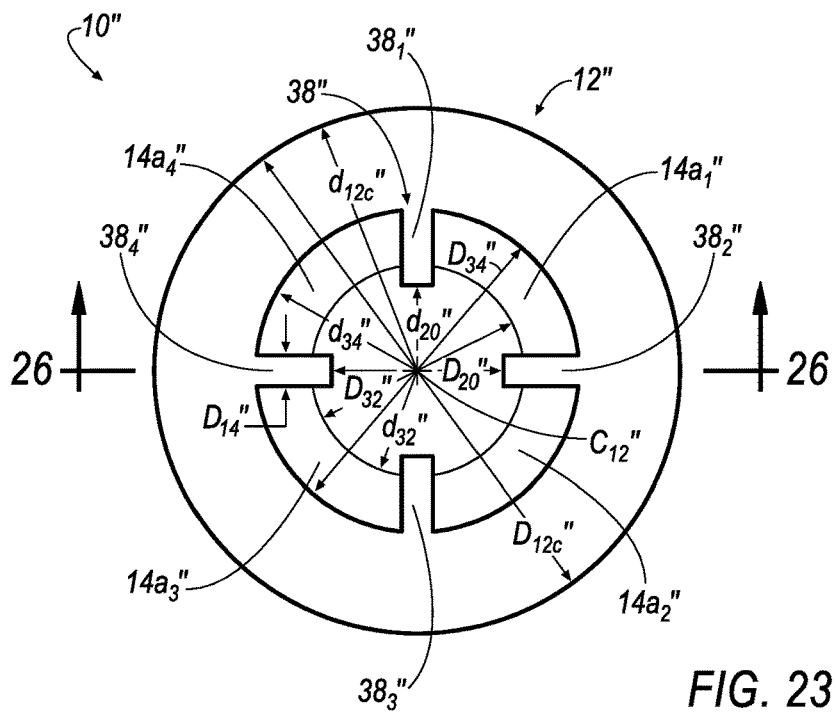
FIG. 23 is a top view of the endcap bypass plug of FIG. 22.
Figure 24:
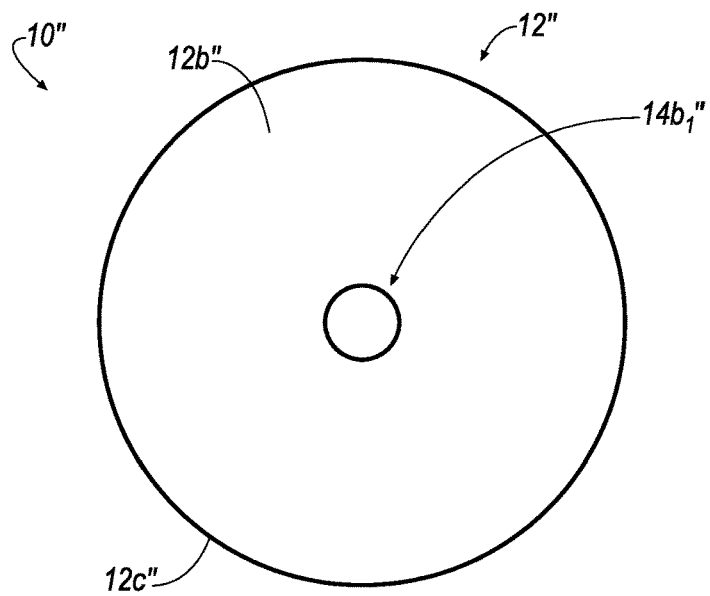
FIG. 24 is a bottom view of the endcap bypass plug of FIG. 22.
Figure 25:
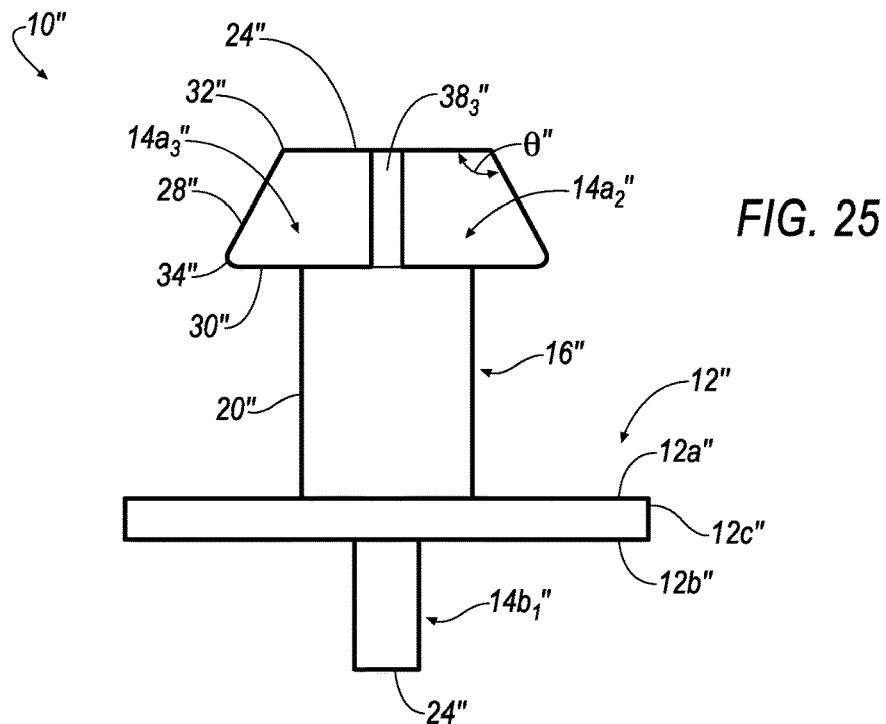
FIG. 25 is a side view of the endcap bypass plug of FIG. 22.
Figure 26:
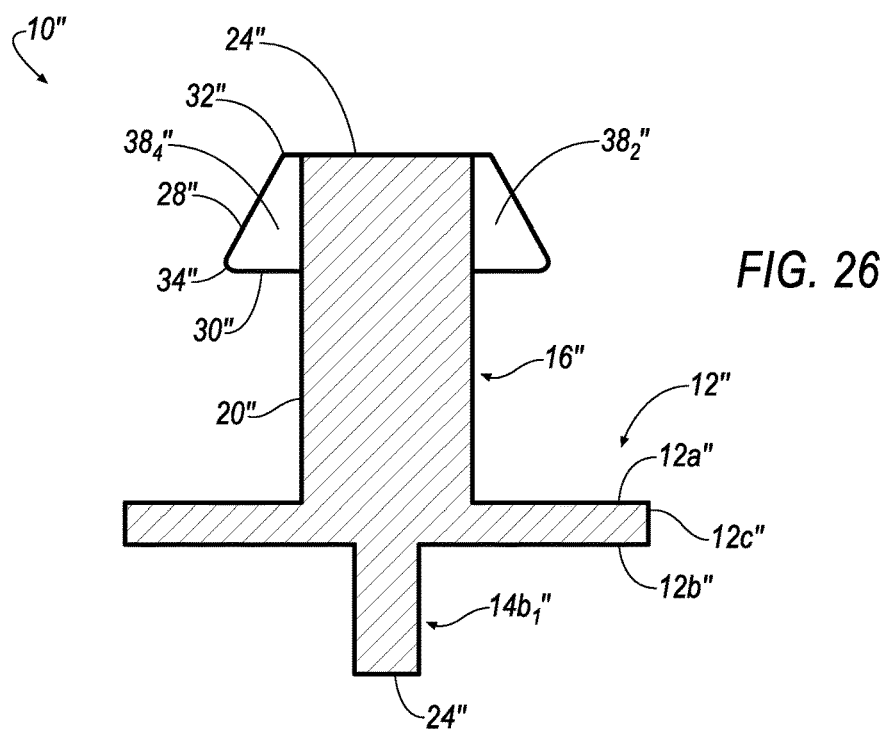
FIG. 26 is a cross-sectional view of the endcap bypass plug according to line 26-26 of FIG. 23.

Referring to FIG. 22, the endcap bypass plug 10" includes an annular body 12" having an upper surface 12a", a lower surface 12b" and an outer side surface 12c" joining the upper surface 12a" to the lower surface 12b". The outer side surface 12c" of the annular body 12" may define a dimension (e.g., a diameter, $D_{12c}$", as seen in FIG. 23) of the endcap bypass plug 10". A central axis, A-A, may axially extend through an axial center, $C_{12}$", of the annular body 12" of the bypass plug 10".

Leg members 14" may be integral with and extend away from one or more of the upper surface 12a" and the lower surface 12b" of the annular body 12". The leg members 14" may include at least one upper leg member 14a" and at least one lower leg member 14b". The at least one upper leg member 14a" may extend from the upper surface 12a" of the annular body 12". The at least one lower leg member 14b" may extend from the lower surface 12b" of the annular body 12". In an implementation the at least one leg member 14a", 14b" may be defined to respectively include four upper leg members $14a_1$"-$14a_4$" and one lower leg member $14b_1$". Although the endcap bypass plug 10" is described to include leg members 14" having at least one upper leg member 14a" and at least one lower leg member 14b", in some implementations, the at least one lower leg member 14b" may be omitted from the design of the endcap bypass plug 10".

In an implementation, each leg member $14a_1$"-$14a_4$" of the at least one upper leg member 14a" includes a flexible stem portion 16". The flexible stem portion 16" extends away from the upper surface 12a" of the annular body 12". Unlike the endcap bypass plugs 10, 10' described above, in an implementation, the leg members $14a_1$"-$14a_4$" of the at least one upper leg member 14a" form/extend from one flexible stem portion 16" defining a substantially cylindrical body; as a result, the flexible stem portion 16" does not include an inwardly-facing surface (see 18, 18' of the endcap bypass plugs 10, 10'), but, rather, includes an outwardly-facing surface 20". The outwardly-facing surface 20" may define the flexible stem portion 16" to include a circular shape. In an implementation, the lower leg member $14b_1$" may include a cylindrical-shaped geometry.

The outwardly-facing surface 20" of the flexible stem portion 16" may be spaced from the central axis, A-A, extending through the axial center of the annular body 12" at a radius/radial distance, $d_{20}$" (as seen in FIG. 23). As a result, the outwardly-facing surface 20" may define the stem portion 16" of the upper leg member $14a_1$" to include a dimension (e.g., a diameter, $D_{20}$", as seen in FIG. 23).

Referring to FIG. 22, each leg member $14a_1$"-$14a_4$" of the at least one upper leg member 14a" terminates with a head portion 22". The head portion 22" includes an upper surface 24". The upper surface 24" defines each head portion 22" to include an arcuate shape. In an implementation, the lower leg member $14b_1$" does not include a head portion 22" as described above regarding the upper leg member $14a_1$". Rather, the lower leg member $14b_1$" includes a distal end surface, which may share the same reference numeral 24" as upper surface 24" of the upper leg member $14a_1$".

The head portion 22" of each leg member $14a_1$"-$14a_4$" of the at least one upper leg member 14a" may further include a nose portion 26" that extends radially outwardly from the head portion 22". In an implementation, the nose portion 26" may be defined by a ramp surface 28" and a lower surface 30". The ramp surface 28" and the lower surface 30" define the nose portion 26" to include an arcuate shape. In an implementation, the lower leg member $14b_1$" does not include a nose portion as described above.

The ramp surface 28" of the nose portion 26" is connected to the upper surface 24" of the head portion 22" to define an upper edge 32". The upper edge 32" may be arcuately shaped. The upper edge 32" may be spaced from the central axis, A-A, extending through the axial center of the annular body 12" at a radius/radial distance, $d_{32}$" (as seen in FIG. 23); as a result, the upper edge 32" defines a dimension (e.g., a diameter, $D_{32}$", as seen in FIG. 23) of the endcap bypass plug 10". In some implementations, the diameter, $D_{20}$", defined by the outwardly-facing surface 20" of the upper leg member $14a_1$" may be approximately equal to but slightly less than the diameter, $D_{32}$", defined by the upper edge 32' of each leg member $14a_1$"-$14a_4$" of the at least one upper leg member 14a".

Referring to FIG. 23, in some implementations, the ramp surface 28" of the nose portion 26" is connected to the upper surface 24" of the head portion 22" at an angle, θ". In an example, the angle, θ", may be equal to approximately about 120°.

The lower surface 30" of the nose portion 26" is connected to both of the outwardly-facing surface 20" of the flexible stem portion 16" and the ramp surface 28" of the nose portion 26". In some instances, the lower surface 30" of the nose portion 26" is connected to the outwardly-facing surface 20" of the flexible stem portion 16" in a substantially perpendicular orientation. The ramp surface 28" of the nose portion 26" is connected to the lower surface 30" of the nose portion 26" to define a lower edge 34". The lower edge 34" may be arcuately shaped. The lower edge 34" of each nose portion 26" of each leg member $14a_1$"-$14a_4$" of the at least one upper leg member 14a" may be spaced from the central axis, A-A, extending through the axial center of the annular body 12" at a radius/radial distance, $d_{34}$" (as seen in FIG. 23); as a result, the lower edge 34" of each leg member $14a_1$"-$14a_4$" of the at least one upper leg member 14a" may define a dimension (e.g., a diameter, $D_{34}$", as seen in FIG. 23) of the endcap bypass plug 10".

Referring to FIG. 23, in some implementations, the four leg members $14a_1$"-$14a_4$" of the at least one upper leg member 14a" may each be equally spaced apart by an arcuate distance, $D_{14}$". The arcuate distance, $D_{14}$", results in neighboring leg members of the four leg members $14a_1$"-$14a_4$" forming at least one radial passage 38" (i.e., four radial passages $38_1$"-$38_4$") defining radial fluid-flow paths, $F_R$ (see, e.g., FIG. 27B) there between, which are referenced from the central axis, A-A, extending through the axial center of the endcap bypass plug 10".

Figure 27A:
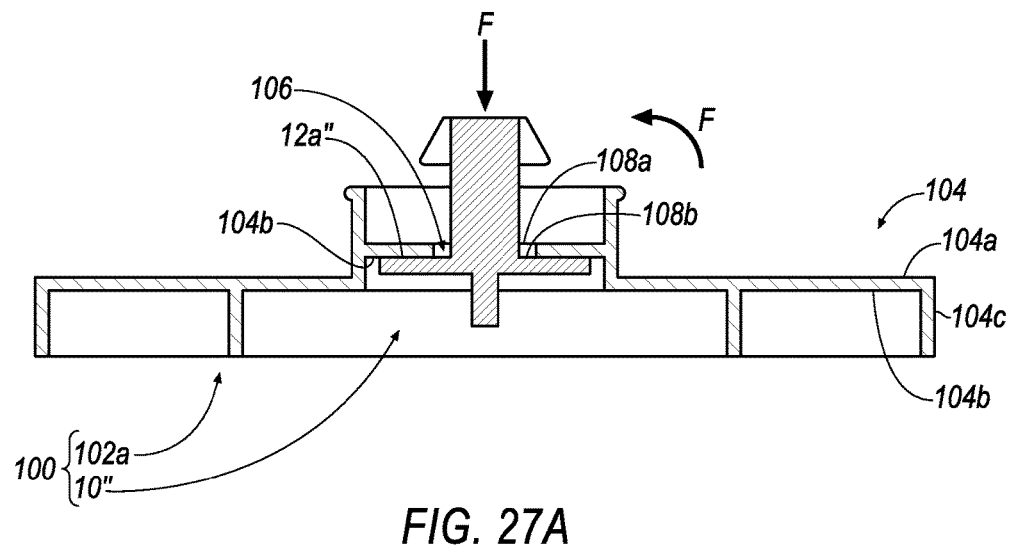
FIG. 27A is a cross-sectional view of an exemplary endcap assembly including the endcap bypass plug of FIG. 22 arranged in an assembled, sealed orientation.
Figure 27B:
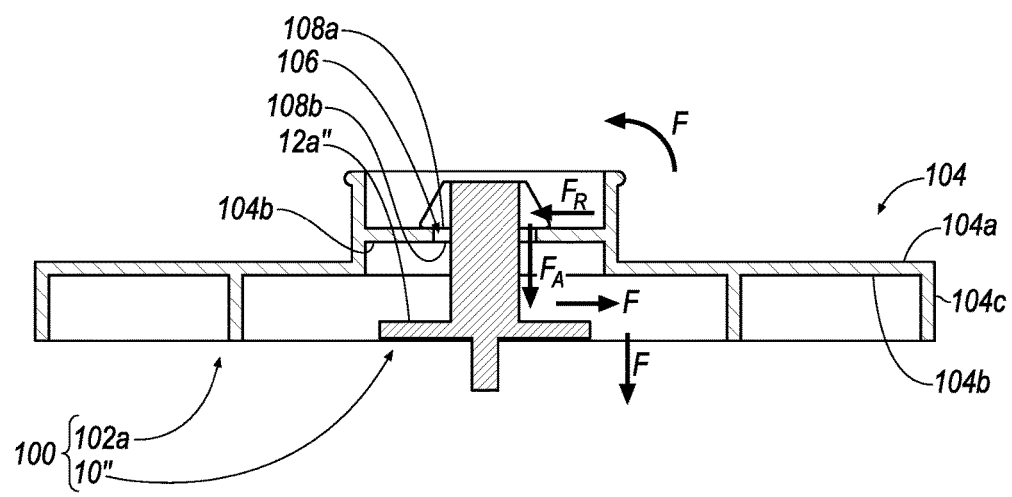
FIG. 27B is another cross-sectional view of the endcap assembly according to FIG. 27A arranged in an assembled, unsealed orientation.
Figure 27A:
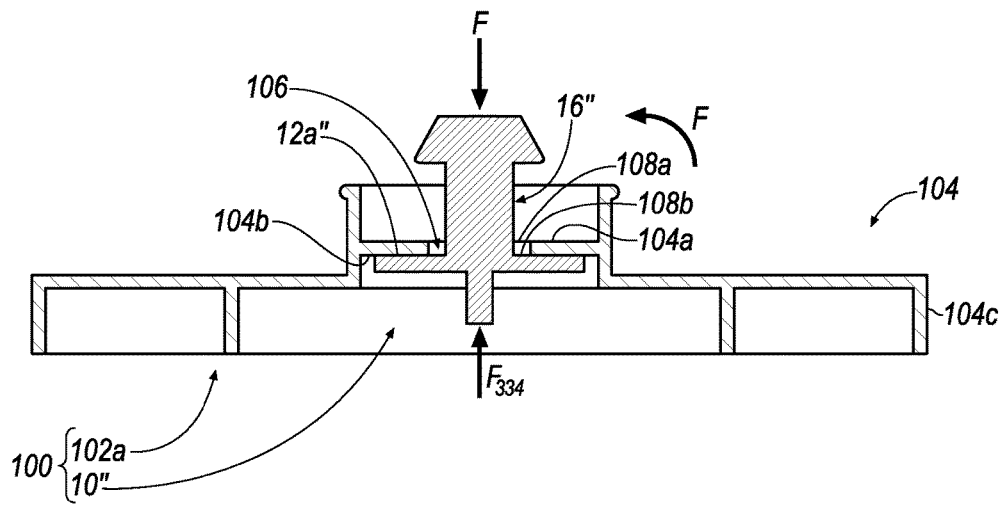
Figure 27B:
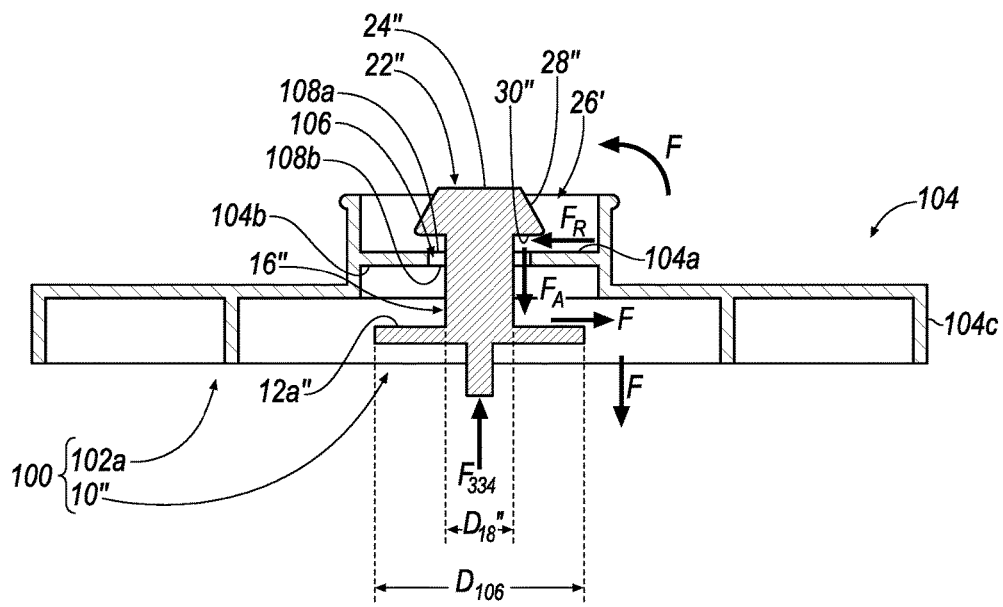

Referring to FIGS. 27A-27B, an embodiment of an endcap assembly 100 includes the endcap bypass plug 10" arranged within the axial passage 106 of the endcap 102a such that the endcap bypass plug 10" is movably-connected connected to the endcap 102a. The endcap bypass plug 10" may include a deformable material that permits the nose portion 26" of the four leg members $14a_1$"-$14a_4$" to materially deform when the endcap bypass plug 10" is inserted through the axial passage 106 (by way of lower opening 108b) of the endcap 102a for joining the endcap bypass plug 10" to the endcap 102a. The stem portion 16" of the endcap bypass plug 10" is movably-arranged within the axial passage 106 of the endcap 102a along the central axis, A-A, that axially extends through the axial center of each of the bypass plug 10" and the endcap 102a. The endcap 102a includes the same design as shown and described above at FIGS. 6-8.

The endcap bypass plug 10" is permitted to be movably-arranged within the axial passage 106 of the endcap 102a in order to configure the endcap assembly 100 to be arranged in one of at least two orientations. The first orientation may be a fluidly unsealed orientation (see, e.g., FIG. 27B), and, the second orientation may be a fluidly sealed orientation (see, e.g., FIG. 27A).

As seen, for example, in FIG. 27B, the unsealed orientation of the endcap assembly 100 is defined by/realized when the upper surface 12a" of the annular body 12" of the endcap bypass plug 10" is arranged in an opposing, spaced-apart relationship with respect to the lower surface 104b of the annular body 104 of the endcap 102a; when arranged in such an orientation, a fluid, F, is permitted to flow: (1) from about the upper surface 104a of the annular body 104 of the endcap 102a, (2) radially through the at least one radial passage 38" along the radial fluid-flow path, $F_R$, and toward the outwardly-facing surface 20" of the stem portion 16", then (3) axially into the upper opening 108a formed by the upper surface 104a of the endcap 102a, and (4) axially through the axial passage 106 along the axial fluid-flow path, $F_A$, (5) out of the lower opening 108b formed by the lower surface 104b of the endcap 102a, and (6) about the lower surface 104b of the annular body 104 of the endcap 102a. As a result of the cooperation of the axial passage 106 of the endcap 102a and the at least one radial passage 38" of the endcap bypass plug 10", collectively, the axial passage 106 and the at least one radial passage 38" may define the endcap assembly 100 to include at least one fluid-flow bypass passages (that are similar to the at least one fluid-flow bypass passages 110 of the endcap assembly 100).

Although the endcap bypass plug 10" is described to include the at least one radial passage 38", some implementations (as seen in, for example, FIGS. 27A'-27B') of the endcap bypass plug 10" may not include the at least one radial passage 38" and thereby form one circular-shaped leg member $14a_1$". For example, as seen in FIGS. 27A'-27B', if the head portion 22" and the nose portion 26" do not include the at least one radial passage 38", the upper surface 24" of the head portion 22" may form a flat, circular surface, and, the ramp surface 28" of the nose portion 26" may form frustoconical surface. Therefore, when the endcap bypass plug 10" (that doesn't include the at least one radial passage 38") is arranged in an orientation including a spaced-apart relationship between: (1) the lower surface 30" of the endcap bypass plug 10" and the upper surface 104a of the endcap 102a, and (2) the upper surface 12a" of the endcap bypass plug 10" and the lower surface 104b of the endcap 102a, the endcap assembly 100 may be said to be arranged in the unsealed orientation, and, as a result of the stem portion 16" having a smaller diameter, $D_{18}$", than a diameter, $D_{106}$, of the axial passage 106, the fluid, F, is permitted to flow through the axial passage 106 (and about the stem portion 16" of the endcap bypass plug 10") from the upper surface 104a of the endcap 102a toward and beyond the lower surface 104b of the endcap 102a without having to flow through at least one radial passage (as seen at 38" in FIGS. 27A-27B) of the endcap bypass plug 10". In such an implementation, the lower surface 30" of the endcap bypass plug 10" may be prevented from being fully seated adjacent the upper surface 104a of the endcap 102a by way of a biasing force, such as, for example, the biasing force, $F_{344}$, arising from, for example, the coil spring 344, which may be indirectly applied from the bypass valve 330.

As seen, for example, in FIG. 27A, the sealed orientation of the endcap assembly 100 is defined by/realized when the upper surface 12a" of the annular body 12" of the endcap bypass plug 10" is arranged in an adjacent relationship with the lower surface 104b of the annular body 104 of the endcap 102a while also closing-out and fluidly-sealing the lower opening 108b formed by the lower surface 104b of the endcap 102a; when arranged in such an orientation, the fluid, F, remains about: (1) about the upper surface 104a of the annular body 104 of the endcap 102a, (2) within the upper opening 108a formed by the upper surface 104a of the endcap 102a, and (3) axially within the axial passage 106, and, as a result, the fluid, F, is not permitted to flow: (4) out of the lower opening 108b formed by the lower surface 104b of the endcap 102a. Therefore, the fluid, F, is not permitted to be arranged (5) about the lower surface 104b of the annular body 104 of the endcap 102a, and, as a result, the fluid, F, remains: (6) about the upper surface 104a of the annular body 104 of the endcap 102a.

In some implementations, the upper surface 12a" of the annular body 12" of the endcap bypass plug 10" may include a sealing member that is substantially similar to the sealing member 36 as shown and described above at FIGS. 4'-5'. Although not illustrated, the endcap assembly 100 (including the endcap 102a and the endcap bypass plug 10" described above at FIGS. 27A-27B) may be joined to filter media (see, e.g., the filter media 202 of FIGS. 12-14) form forming a filter assembly. The filter assembly may also include a lower endcap (see, e.g., the lower endcap 102b of FIGS. 12-14). The filter assembly may be arranged within an enclosure (see, e.g., the enclosure 300 of FIGS. 15A-15G) and function in a substantially similar manner as described above at FIGS. 15E-15G.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. An endcap bypass plug, comprising:
   a body having an upper surface, a lower surface and an outer side surface joining the upper surface to the lower surface, wherein a central axis extends through an axial center of the body;
   a first plurality of leg members disposed about the central axis and connected to and extending away from the upper surface of the body, wherein adjacent leg members of the first plurality of leg members are spaced apart by a first distance to thereby form a plurality of radial passages defining a plurality of radial fluid-flow paths there between, wherein each leg member of the first plurality of leg members includes:
      a head portion having an upper surface, wherein the head portion includes
      a nose portion extending radially outwardly from the head portion, wherein the nose portion includes a ramp surface and a lower surface, wherein the ramp surface of the nose portion is connected to the upper surface of the head portion to define an upper edge, wherein the ramp surface of the nose portion is connected to the lower surface of the nose portion to define a lower edge; and
   a second plurality of leg members disposed about the central axis and connected to and extending away from the lower surface of the body, wherein adjacent leg members of the second plurality of leg members are spaced apart by a second distance to define a central passage extending along the central axis.

2. The endcap bypass plug of claim 1, wherein each leg member of the first plurality of leg members includes a stem portion that extends axially away from the upper surface of the body, and wherein each leg member of the second plurality of leg members includes a stem portion that extends axially away from the lower surface of the body.

3. The endcap bypass plug of claim 2, wherein the stem portion of each one of the leg members of the first plurality of leg members extends axially away from the upper surface of the body at a first length, and the stem portion of each one of the leg members of the second plurality of leg members extends axially away from the lower surface of the body at a second length.

4. The endcap bypass plug of claim 3, wherein the first length of each one of the leg members of the first plurality of leg members is greater than the second length of each one of the leg member of the second plurality of leg members.

5. The endcap bypass plug of claim 3, wherein the first length of each one of the leg members of the first plurality of leg members is about eight times the second length of each one of the leg members of the second plurality of leg members.

6. The endcap bypass plug of claim 2, wherein the stem portion of each leg member of the first plurality of leg members includes
   an inwardly-facing surface, and
   an outwardly-facing surface, wherein the inwardly-facing surface is spaced from the central axis at a first radial distance, wherein the outwardly-facing surface is spaced from the central axis at a second radial distance that is greater than the first radial distance for defining the stem portion to include an arcuate geometry, wherein opposing leg members of the first plurality of leg members are arranged about the central axis in a circular orientation such that:
      the inwardly-facing surface of the stem portion of each leg member of the first plurality of leg members forms a first diameter, and
      the outwardly-facing surface of the stem portion of each leg member of the first plurality of leg members forms a second diameter, wherein the second diameter is greater than the first diameter.

7. The endcap bypass plug of claim 6, wherein the upper edge of each leg member of the first plurality of leg members is spaced from the central axis at a third radial distance such that the upper edge of each leg member of the first plurality of leg members forms a third diameter, wherein the lower edge of each leg member of the first plurality of leg members is spaced from the central axis at a fourth radial distance such that the lower edge of each leg member of the first plurality of leg members forms a fourth diameter, wherein the fourth diameter is greater than the third diameter to define the ramp surface of each leg member of the first plurality of leg members to include an arcuate geometry.

8. The endcap bypass plug of claim 7, wherein the outer side surface of the body is spaced from the central axis at a fifth radial distance such that the body forms a fifth diameter, wherein the fifth diameter is greater than the fourth diameter.

9. An endcap assembly, comprising:
   an endcap including an annular body having an upper surface, a lower surface and an outer side surface joining the upper surface to the lower surface, wherein the endcap forms an axial passage that extends through a thickness of the annular body, wherein the axial passage defines an axial fluid-flow path, wherein access to the axial passage is provided by an upper opening formed by the upper surface of the annular body and a lower opening formed by the lower surface of the annular body; and
   an endcap bypass plug including:
      a body having an upper surface, a lower surface and an outer side surface joining the upper surface to the lower surface, wherein a central axis extends through an axial center of the body;
      a first plurality of leg members disposed about the central axis and connected to and extending away from the upper surface of the body, wherein adjacent leg members of the first plurality of leg members are spaced apart by a first distance to thereby form a plurality of radial passages defining a plurality of radial fluid-flow paths there between, wherein each leg member of the first plurality of leg members includes:
  a head portion having an upper surface, wherein the head portion includes
  a nose portion extending radially outwardly from the head portion; and
a second plurality of leg members disposed about the central axis and connected to and extending away from the lower surface of the body, wherein adjacent leg members of the second plurality of leg members are spaced apart by a second distance to define a central passage extending along the central axis, wherein the endcap bypass plug is movably-arranged within the axial passage such that the endcap bypass plug is movably-connected to the endcap in one of:
  a sealed orientation, and
  an unsealed orientation, wherein a fluid flows through the axial passage from the upper surface of the endcap and beyond the lower surface of the endcap when the endcap bypass plug is movably-arranged within the axial passage in the unsealed orientation, wherein the fluid is prevented from flowing through the axial passage from the upper surface of the endcap and beyond the lower surface of the endcap when the endcap bypass plug is movably-arranged within the axial passage in the sealed orientation.

10. The endcap assembly of claim 9, wherein the nose portion includes a ramp surface and a lower surface, wherein the ramp surface of the nose portion is connected to the upper surface of the head portion to define an upper edge, the ramp surface of the nose portion is connected to the lower surface of the nose portion to define a lower edge.

11. The endcap assembly of claim 9, wherein the endcap bypass plug forms
  a plurality of radial passages defining a plurality of radial fluid-flow paths, wherein the plurality of radial passages of the endcap bypass plug cooperates with the axial passage of the endcap defining the axial fluid-flow path to form
    at least one fluid-flow bypass passage when the endcap bypass plug is movably-arranged within the axial passage in the unsealed orientation, wherein the fluid flows through the at least one fluid-flow bypass passage when the endcap bypass plug is movably-arranged within the axial passage in the unsealed orientation.

12. The endcap assembly of claim 9, wherein each leg member of the first plurality of leg members includes a stem portion that extends axially away from the upper surface of the body, and wherein each leg member of the second plurality of leg members includes a stem portion that extends axially away from the lower surface of the body.

13. The endcap assembly of claim 12, wherein the stem portion of each one of the leg members of the first plurality of leg members extends axially away from the upper surface of the body at a first length, and the stem portion of each one of the leg members of the second plurality of leg members extends axially away from the lower surface of the body at a second length.

14. The endcap assembly of claim 13, wherein the first length of each one of the leg members of the first plurality of leg members is greater than the second length of each one of the leg members of the second plurality of leg members.

15. The endcap assembly of claim 13, wherein the first length of each one of the leg members of the first plurality of leg members is about eight times the second length of each one of the leg members of the second plurality of leg members.

16. The endcap bypass plug of claim 1, wherein the first plurality of leg members each includes a first inwardly-facing surface, and the second plurality of leg members each includes a second inwardly-facing surface, the first inwardly-facing surfaces collectively defining a first dimension, the second inwardly-facing surfaces collectively defining a second dimension equal to the first dimension.

17. The endcap assembly of claim 9, wherein the first plurality of leg members each includes a first inwardly-facing surface, and the second plurality of leg members each includes a second inwardly-facing surface, the first inwardly-facing surfaces collectively defining a first dimension, the second inwardly-facing surfaces collectively defining a second dimension equal to the first dimension.

* * * * *